(12) United States Patent
Buhr

(10) Patent No.: US 8,814,697 B2
(45) Date of Patent: Aug. 26, 2014

(54) METHOD AND APPARATUS FOR USE IN PRESERVING A GAME STATE

(75) Inventor: Brian Douglas Buhr, San Diego, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 0 days.

(21) Appl. No.: 13/188,631

(22) Filed: Jul. 22, 2011

(65) Prior Publication Data

US 2012/0270644 A1     Oct. 25, 2012

Related U.S. Application Data

(60) Provisional application No. 61/477,104, filed on Apr. 19, 2011.

(51) Int. Cl.
*G06F 17/00*     (2006.01)
*G06F 19/00*     (2011.01)

(52) U.S. Cl.
USPC .......................................................... 463/42

(58) Field of Classification Search
USPC ............... 463/40–43; 709/223, 224, 227, 228
See application file for complete search history.

(56) References Cited

U.S. PATENT DOCUMENTS

| | | | |
|---|---|---|---|
| 7,351,138 B2 * | 4/2008 | Busse et al. ................ 463/1 |
| 7,354,345 B2 | 4/2008 | Bortnik et al. | |
| 7,559,834 B1 | 7/2009 | York | |
| 8,423,063 B2 | 4/2013 | Premutico | |
| 8,439,733 B2 * | 5/2013 | Kay et al. .................... 463/7 |
| 2002/0094871 A1 * | 7/2002 | Luciano et al. ............ 463/43 |
| 2003/0073494 A1 | 4/2003 | Kalpakian et al. | |
| 2005/0043097 A1 | 2/2005 | March et al. | |
| 2005/0278041 A1 | 12/2005 | Bortnik et al. | |
| 2006/0154710 A1 * | 7/2006 | Serafat ........................ 463/1 |
| 2007/0005693 A1 | 1/2007 | Sampath et al. | |
| 2007/0077991 A1 * | 4/2007 | Horigome ................... 463/40 |
| 2007/0087799 A1 | 4/2007 | Van Luchene | |
| 2008/0207332 A1 * | 8/2008 | Bortnik et al. ............. 463/42 |

(Continued)

FOREIGN PATENT DOCUMENTS

| | | |
|---|---|---|
| WO | WO 2012/145231 A1 | 10/2012 |
| WO | 2013142063 | 9/2013 |

OTHER PUBLICATIONS

Patent Cooperation Treaty; "Notification of Transmittal of the International Search Report and the Written Opinion of the International Searching Authority, or the Declaration" issued in corresponding foreign application No. PCT/US12/33375, mailed Jul. 5, 2012, 2 pages.

(Continued)

*Primary Examiner* — Milap Shah
(74) *Attorney, Agent, or Firm* — Fitch, Even, Tabin & Flannery LLP

(57) ABSTRACT

Several embodiments of the invention advantageously provide systems, apparatuses, processes and methods of providing an interactive electronic game. Some of these methods comprise: detecting a loss of connection over a distributed network with a first user remotely accessing and participating in an interactive electronic game in progress; determining, in response to detecting the loss of the connection with the first user, a game state associated with the first user; determining whether a confirmation is received from the first user confirming that the first user intends to rejoin the interactive game; and retaining, in response to determining that the confirmation is received, the game state.

19 Claims, 12 Drawing Sheets

(56) References Cited

U.S. PATENT DOCUMENTS

| | | | |
|---|---|---|---|
| 2008/0227534 | A1 | 9/2008 | Kelly et al. |
| 2008/0274802 | A1 | 11/2008 | Joao |
| 2008/0318655 | A1* | 12/2008 | Davies .......................... 463/16 |
| 2009/0125637 | A1* | 5/2009 | Matuszewski ................ 709/238 |
| 2009/0181775 | A1* | 7/2009 | Nilsson et al. ................. 463/42 |
| 2010/0227691 | A1* | 9/2010 | Karsten .......................... 463/42 |
| 2010/0311483 | A1 | 12/2010 | Fields et al. |
| 2010/0311506 | A1 | 12/2010 | Bai |
| 2011/0066720 | A1* | 3/2011 | Wang et al. ................... 709/224 |
| 2011/0172018 | A1 | 7/2011 | Premutico |
| 2011/0237332 | A1* | 9/2011 | Abiko ............................ 463/42 |
| 2013/0252725 | A1 | 9/2013 | Buhr |
| 2013/0344966 | A1 | 12/2013 | Mustafa |

OTHER PUBLICATIONS

Patent Cooperation Treaty; "International Search Report" issued in corresponding foreign application No. PCT/US12/33375, mailed Jul. 5, 2012, 6 pages.

Patent Cooperation Treaty; "Written Opinion of the International Searching Authority" issued in corresponding foreign application No. PCT/US12/33375, mailed Jul. 5, 2012, 5 pages.

USPTO; Final Office Action issued in U.S. Appl. No. 13/426,456, mailed Jun. 28, 2013, 14 pages.

Patent Cooperation Treaty; "Notification of Transmittal of the International Search Report and the Written Opinion of the International Searching Authority, or the Declaration" issued in foreign application No. PCT/US13/29372, mailed Mar. 29, 2013, 1 page.

Patent Cooperation Treaty; "International Search Report" issued in foreign application No. PCT/US13/29372, mailed Mar. 29, 2013, 2 pages.

Patent Cooperation Treaty; "Written Opinion of the International Searching Authority" issued in foreign application No. PCT/US13/29372, 8 pages.

USPTO; Non-Final Office Action issued in U.S. Appl. No. 13/426,456; Mailed Mar. 13, 2013; 20 Pages.

USPTO; Non-Final Office Action Issued in U.S. Appl. No. 13/426,456; Mailed Oct. 18, 2013; 14 Pages.

UPSTO; Notice of Allowance issued in U.S. Appl. No. 13/426,456; Mailed Apr. 4, 2014; 16 Pages.

* cited by examiner

METHOD AND APPARATUS FOR USE IN PRESERVING A GAME STATE

This application claims the benefit of U.S. Provisional Application No. 61/477,104, filed Apr. 19, 2011, for Brain Buhr, entitled METHOD AND APPARATUS FOR USE IN PRESERVING A GAME STATE, which is incorporated in its entirety herein by reference.

BACKGROUND OF THE INVENTION

1. Field of the Invention

The present invention relates generally to computer simulations, and more specifically to user interaction with simulations.

2. Discussion of Related Art

Many simulation systems, such as computers, gaming systems and/or entertainment systems, allow users to interact with simulations, such as interactive gaming simulations. Similarly, some systems allow multiple users to participate in interactive game simulations. Typically, the multiple users communicate with one or more other simulation systems to provide at least some control over the playback of the game simulation. For example, in some instances users utilize one or more input devices, such as a keyboard, mouse, joystick, a hand-held controller, game controller, or other controller. A user or player uses the controller to send commands or other instructions affect control and/or playback of the simulation. For example, the controller may be provided with one or more manipulators which are operated by a user, such as a joy stick, one or buttons, roller ball, scroll wheel, and/or other such manipulators, such that signals corresponding to the manipulation of the one or more manipulators are sent to a local simulation system and/or other remote simulation systems.

It is with respect to these and other background information factors that the present invention has evolved.

SUMMARY OF THE INVENTION

Several embodiments of the invention advantageously address the needs above as well as other needs by providing methods of providing an interactive electronic game. Some of these methods comprise: detecting a loss of connection over a distributed network with a first user remotely accessing and participating in an interactive electronic game in progress; determining, in response to detecting the loss of the connection with the first user, a game state associated with the first user; determining whether a confirmation is received from the first user confirming that the first user intends to rejoin the interactive game; and retaining, in response to determining that the confirmation is received, the game state.

Some embodiments can be characterized as one or more computer program products comprising a medium for embodying a computer program for input to a processor based system and a computer program embodied in the medium for causing the processor based system to perform steps of: detecting a loss of connection over a distributed network with a first user remotely accessing and participating in an interactive electronic game in progress; determining, in response to detecting the loss of the connection with the first user, a game state associated with the first user; determining whether a confirmation is received from the first user confirming that the first user intends to rejoin the interactive game; and retaining, in response to determining that the confirmation is received, the game state.

Other embodiments can be characterized as systems configured to allow users to participate in an interactive game, these systems comprise: means for detecting a loss of connection over a distributed network with a first user remotely accessing and participating in an interactive electronic game in progress; means for determining, in response to detecting the loss of the connection with the first user, a game state associated with the first user; means for determining whether a confirmation is received from the first user confirming that the first user intends to rejoin the interactive game; and means for retaining, in response to determining that the confirmation is received, the game state.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
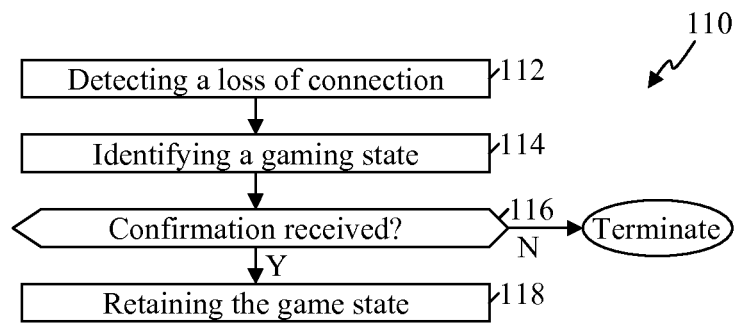
FIG. 1 illustrates a simplified flow diagram of a process of retaining a user's position and/or statistics within an active interactive electronic simulation, for example as a result of a connection failure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DESCRIPTION OF THE EMBODIMENTS

The following description is not to be taken in a limiting sense, but is made merely for the purpose of describing the general principles of exemplary embodiments. The scope of the invention should be determined with reference to the claims.

Many multi-user computer simulations allow users to connect with and participate in a simulation via a distributed network, such as the Internet, a local area network or other such distributed networks. A participant's device connected over the distributed network may experience difficulties in maintaining a connection over the distributed network or in maintaining a sufficiently effective connection to continue participation in the simulation. It is a common problem for participants of a simulation, such as an interactive electronic game, to lose connection or experience insufficient connectivity or bandwidth with a device hosting or managing the simulation, such as a game server, or experience other difficulties with their system and/or the communication with other devices hosting the game simulation. The loss of connection, insufficient connectivity and/or other such problems that can prevent a user from participating in and/or effectively participating in the simulation can result from any number of things or combinations of things, such as a device problem or failure (e.g., a game client crash), internet connection loss, temporary decrease in network connection bandwidth causing server disconnect, short power cycle and/or outage, or other reasons.

When a loss of connection, sufficiently degraded connectivity is experienced and/or other such problems that interfere with a users ability to effectively participate in a simulation is experienced, often a participant in a simulation (e.g., a game player) loses her/his place or position at the hosting device or simulation server and within the simulation. As a specific example, often when connectivity is lost between an electronic game server hosting an interactive electronic game and a user's game console, the player participating through the game console loses her place in the game server, and typically loses her association or position with teammates or friends also participating in the simulation. The user also may lose her status, position, points, levels and other such statistics; be forced to accept a "loss" or "quit" result; and/or may be unable to rejoin the game or same team within the game because the game or team has become full with other participants (e.g., an alternate user joins the game as a result of the open position within the game as a result of the first user's lost connection).

The present embodiments provide methods and systems to retain a user's position within a simulation as a result of a failure, a disconnect, degraded connection or other such factors that might otherwise result in the user being dropped from a simulation, such as an interactive game. In general, some embodiments detect the loss of connection and initiate a process of retaining a user's position, game states, statistics, attributes and the like. The user can then return to the simulation and resume her/his participation in the simulation. Further, some embodiments maintain the user's position and/or statistics for the simulation in response to receiving a confirmation from the user that the user intends to return to the simulation.

In the following discussion of embodiments of the present invention are described with respect to a multi-user or multi-player computer game, such as a video game, hosted by one or more game servers. However, it should be understood that the system and method described herein is capable of being used with any computer simulation, game player, portable device and/or media playback system, as well as any system, device or devices providing users with the ability to participate in a simulation. Similarly, the description below is generally described with reference to one or more users losing connections. It will be apparent to those skilled in the art that the invention is not limited to the loss of a connection but can be based substantially any failure or problem that interferes with a user's ability to effectively participate and/or on detecting a user's failure to interact with the simulation, and in some instances a failure to effectively interact (e.g., where interaction is only intermittently received, or other such ineffective interaction).

FIG. 1 illustrates a simplified flow diagram of a process 110 of retaining a user's position, game state (e.g., attributes, scores, statistics and the like) within an active interactive simulation, such as an electronic game simulation, as a result of a connection failure or other factor inhibiting a user's ability to participate in the interactive simulation. Again, a connection failure may be a complete disconnect or may result from an insufficient connectivity, bandwidth or the like that exceeds a threshold level such that the game server cannot accurately implement the user's control during the game simulation, failure at a computer or game console the user is utilizing to participate in the simulation, a power failure, an inadvertent action by the user (e.g., inadvertent shutdown of the simulation, game console, computer or the like), or other such failures. The process 110 may be used in a computer simulation, such as a computer game.

In step 112, a game server detects the loss of connection with the user participating in the game. The game server may detect the loss through one or more methods, such as periodic tests of connections, detecting a lack of communication over the connection and/or from a user, the lack of participation by a user, a direct communication from the user notifying the server of a problem and/or expected loss of connection, and/or other such methods. As such, a user may still be connected but the user may have the ability to proactively notify the game server to reserve her position, for example, if the user knows in advance that her game client is experiencing some issue prior to actually disconnecting and reconnecting, or in case the game server does not recognize the disconnection right away and fails to contact the user.

In step 114, a gaming state of the interactive game with which the user was participating is identified. The process continues to step 116 to determine whether a confirmation is received from the user confirming that the user intends to return and rejoin the game. In some instances this determination is limited by a threshold time period where the confirmation should be received within the threshold time period. Further, in many embodiments, this confirmation may be received over a secondary mode or channel of communication that is different than the lost connection between the game server and the user's game device or console. Still further, the confirmation may be received in response to an inquiry or request over the secondary mode of communication from the game server, alternate device or a third party device as described in detail below.

When a confirmation is not received the process 110 terminates. Alternatively, in those instances where a confirmation is received that the user intends to return to the game, step 118 is entered where a game state, status and/or statistics associated with the user is retained. The game state, status and/or statistics can include substantially any relevant information pertaining to the user, the active game, a position within a game, one or more teams, scores, levels, virtual characters, attributes (e.g., characteristics, features, money, treasures, virtual equipment, powers, and the like), names, and/or other such state information. For simplicity, the below description will refer to game state; however, it will be appreciated that the game state can be substantially any relevant information that aids in allowing a user to rejoin an active simulation, such as an active game.

By retaining the game state the game server can subsequently allow the user to reconnect with the game server and rejoin the active game with no or limited disruption to the game, and/or the user's position and status within the game. It is noted, that in some instances one or more penalties, fines or other such consequences may be assessed to the user in order to maintain the user's position within the active game as further described below. The user, however, can return to the same game to again participate in the active game, and in some instances, retain her/his position on a team within the game.

Figure 2:
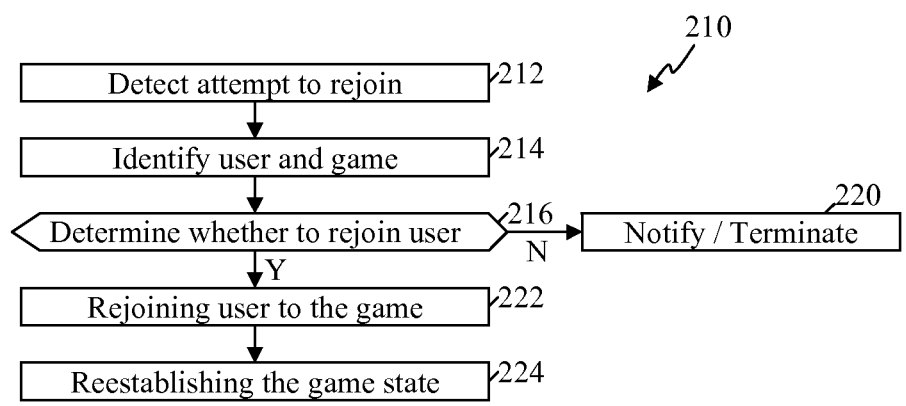
FIG. 2 depicts a simplified flow diagram of a process of rejoining a user to an active game after the user was previously dropped from the game in accordance with some embodiments.

FIG. 2 depicts a simplified flow diagram of a process 210 of rejoining a user to an active game after the user was previously dropped from the game in accordance with some embodiments. In step 212, a game server detects an attempt by a user to rejoin an active game and/or receives a request from a user to rejoin an active game. In step 214, the user is identified and the game or simulation the user is attempting to join is identified.

The process 210 then continues to step 216 where it is determined whether the identified user should be allowed to rejoin the active game. This determination can include one or more considerations and/or factors such as, but not limited to, one or more time thresholds, whether the game is still active, the user's authentication, the user's account status, the user's membership or account level, whether payment has been received, authorization by one or more other participants in the active game, connection and/or network capabilities, system capabilities, game console capabilities and other such factors or combinations of such factors. In those instances where it is determined that a user is not to be rejoined to the game the process advances to step 220 where the user is notify that she/he is not being rejoined to the game. In some instances, further details of why the user is not being rejoined can be provided. The process 210 then terminates.

Alternatively, when it is determined in step 216 that a user is to be rejoined, step 222 is entered where the user is rejoined to the active game. In step 224, the game state(s) and/or statistics associated with the rejoined user are reestablished. Statistics for players are typically held within the memory of the game server, and typically maintained at least until the current round or game is complete. Some game servers may additional retain some or all of the statistics, such as in a database and/or associated with a user. In some embodiments, if a player disconnects prior to the game end, rather than submitting the statistics early to the database, the game server may retain the statistics in memory until the player's reservation window of time in which the player can rejoin the game times out or the player confirms that she/he is not returning. Alternatively, when the player rejoins the game the server can continue to maintain the statistics and associate those statistics with the player when the player is reconnected with the game.

Again, as described above, the exact game state and/or statistics at the time the connection was lost or detected may not be reestablished as a result of, for example, penalties or other such factors as described above and below. For example, in order to maintain the user's position within the game the user may have been required to take action that could reduce a score, count, total, dollar amount or the like (e.g., continuing to bet during a gambling game simulation, using resources such as firing a weapon or using a special power, and the like). Similarly, the system may have implemented actions on the user's behalf to retain the user's position and/or limit or prevent adverse consequences occurring to the user's position, a character within the game, and/or other users participating in the game.

As introduced above, in some embodiments the confirmation that a user intends to return and rejoin an active game in response to the lost connection is obtained through an alternate or secondary mode or method of communication. Because the connection between the game server and the game device utilized by the user may have been lost or is insufficient the confirmation typically cannot be obtained through the primary connection that was lost. As such, some embodiments implement an alternative mode of communication to communicate with the user to receive the confirmation that the user intends to rejoin the game.

Figure 3:
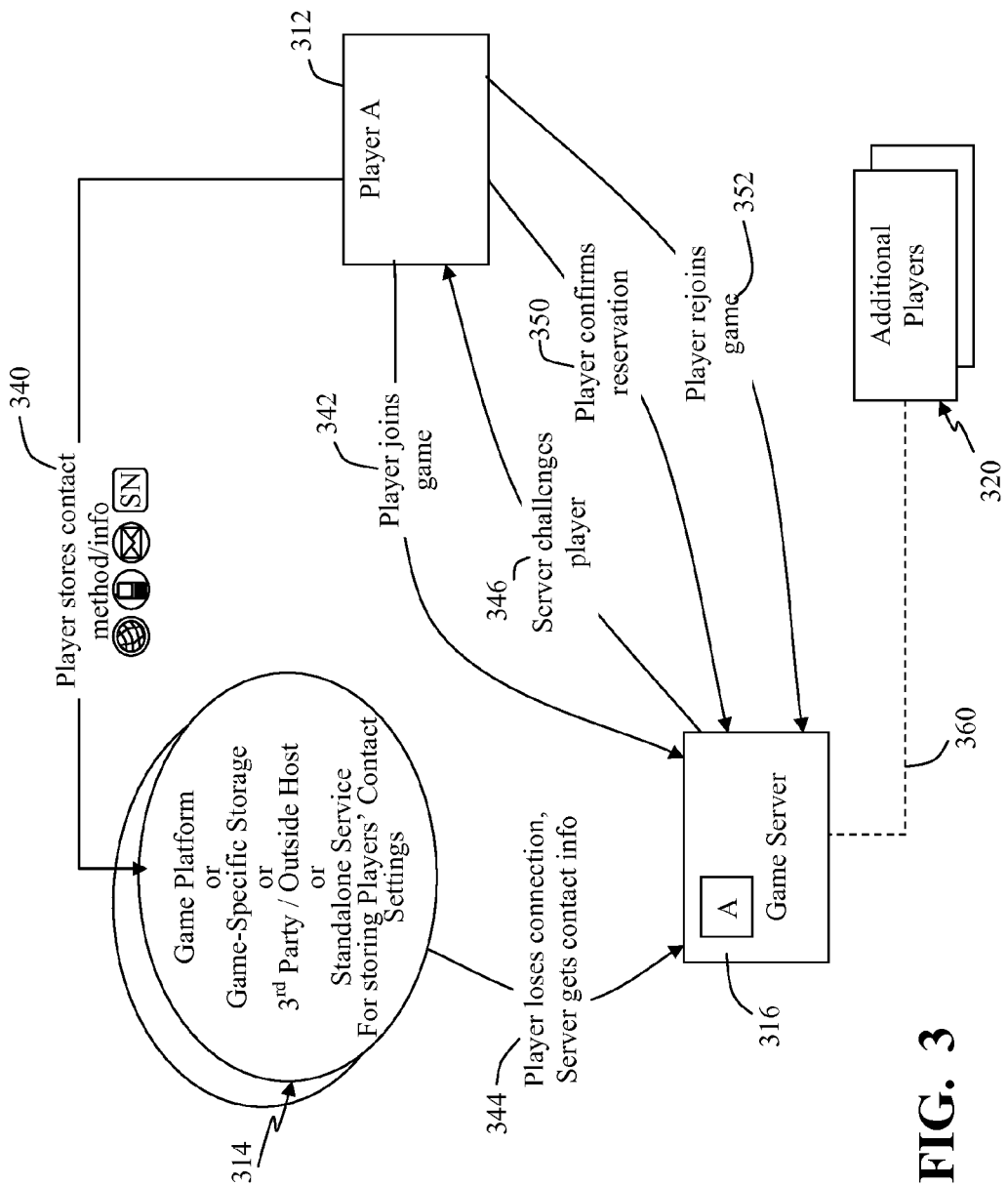
FIG. 3 is an illustration of communications between system components in rejoining a user to an active game.

FIG. 3 is an illustration of communications between system components in rejoining a user to an active game. In some embodiments, a user or user device (e.g., a game console or player) 312 provides, in step 340, one or more alternate or secondary modes of communication to a game platform, game service, third party or outside hosting device(s), and/or other third party service 314. The identified modes of communication can include substantially any mode of communication that are different from the lost connection and/or that is conducted over a different communication mechanism, channel or path. For example, the alternate communication mode can include one or more of, but not limited to, telephone communication, wireless and/or cellular communication, text messaging, short message service (SMS), email, game platform messaging mechanisms, fax, social networking (SN) applications and/or Internet sites, game or game platform Internet sites, one or more other game players in the active game, and other such modes or combinations of such modes. Further, the one or more alternative modes of communication may be defined through a registration process and/or upon initially joining a simulation.

The server, in step 342, activates an interactive game in response to instructions from the user 312 and/or allows the user 312 to join an already active interactive game over a distributed network being hosted by one or more game servers 316. Upon detection at the game server 316 that the connection with the user is lost the game server, in step 344, identifies the secondary mode of communication and the corresponding information to implement the communication (e.g., phone number, email address, and the like). The game server 316, in step 346, then communicates with the user over the secondary mode of communication. In some instances the communication includes a challenge message requesting that the user confirm her/his intention to rejoin the game. The user 312 can issue a confirmation in step 350 confirming the user's intent to rejoin the game. The user 312 then initiates to rejoin the game in step 352. As described above, in some instances the game server 316 continues to allow other users 320 to continue to participate, in step 360, in the interactive game while requesting confirmation for the user and/or when appropriate rejoining the user 312.

In some embodiments, a third party service can communicate with the user in attempts to obtain a confirmation that the user intends to rejoin the game. This may be initiated by the game server 316 communicating with the third party service. This allows the third party service to obtain and retain the user's secondary mode of communication and relevant contact information, and frees up the game server and/or a game platform from having to perform these tasks and retain the information. In other instances, however, certain levels of access, account status, upgrades and/or payment by the user is a condition for allowing the user to participate and take advantage of rejoining a game. In these instances, it may be beneficial for the game platform and/or server to maintain the user's information. In yet other instances, however, the game server and/or game platform can confirm that a user has the sufficient account status or has paid the fees prior to contacting the third party server to initiate the request for the confirmation, or the third party service may verify that the user can be rejoined.

Figure 4:
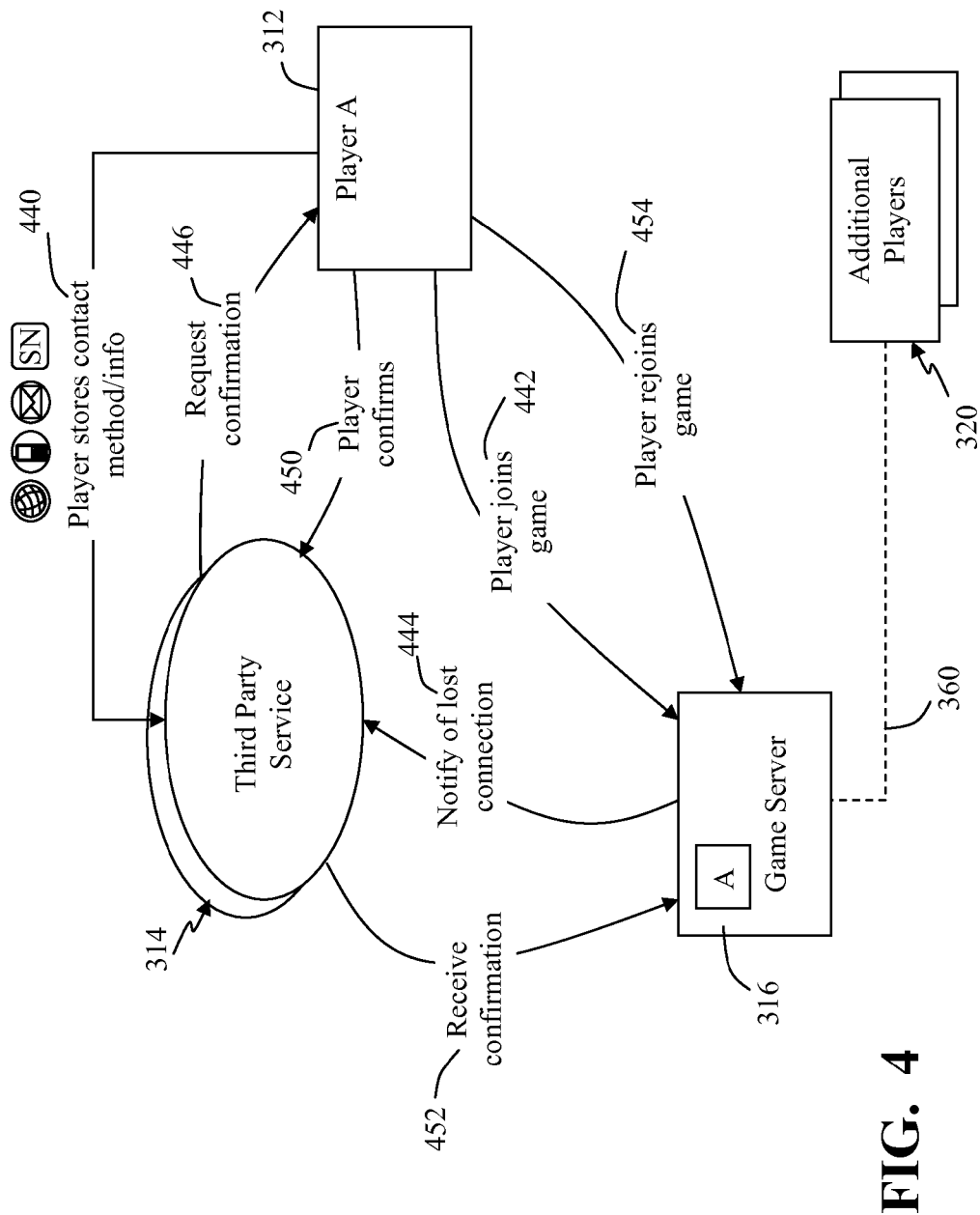
FIG. 4 is an illustration of communications between system components in rejoining a user to an active game according to some embodiments.

FIG. 4 is an illustration of communications between system components in rejoining a user to an active game according to some embodiments. A user 312 provides, in step 440, one or more alternate or secondary modes of communication to one or more third party services 314. The user 312, in step 442, joins or activates an interactive game over a distributed network being hosted by a game server 316. In some implementations, the user may be instructed by the game server, in response to receiving the request to join or activate a game, to provide the secondary mode of communication and/or register with the third party service.

Upon detection at the game server 316 that the connection with the user is lost the game server, in some embodiments, issues a notification in step 444 to the third party service 314 that a connection with the user device 312 has been lost. The third party service 314, in response to the notice, identifies the user and one or more corresponding secondary modes of communication and requests, in step 446, confirmation from the user that the user intends to rejoin the active game.

The user 312, in response to the request, can issue a confirmation in step 450 confirming the user's intent to rejoin the game. Upon receipt of the confirmation the third party service 314 issues, in step 452, a notification to the game server 316 that the user has confirmed an intention to rejoin the game. Once communications have been reestablished the user 312 can then initiate, in step 454, to rejoin the game. Again, this initiation to rejoin may be limited by a threshold time period.

Figure 5:
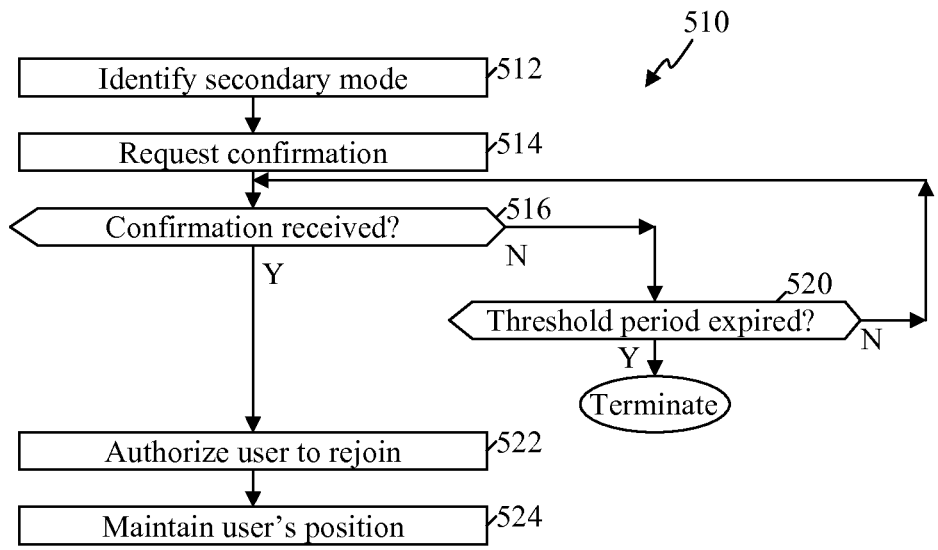
FIG. 5 depicts a simplified flow diagram of a process of determining whether a user intends to return and rejoin the game after a loss of connection with the user is detected.

FIG. 5 depicts a simplified flow diagram of a process 510 of determining whether a user intends to return and rejoin the game after a loss of connection with the user is detected. In some implementations, the process 510 can be used to implement some or all of step 116 of the process 110 of FIG. 1. In step 512, a secondary mode of communication is identified for communicating with the user. In step 514, a challenge or request is issued, using the secondary mode of communication, requesting confirmation that the user intends to rejoin the active game. Again, this request provides the user the opportunity to reserve her position for reconnection (which may be limited by a threshold time period).

In step 516, the process determines whether a confirmation is received from the user confirming the intent to rejoin the game. Typically, this confirmation is received over the secondary mode of communication. For example, the user can respond with a verbal or tone command (e.g., when the secondary mode of communication is via telephone or cellular phone); the user can respond through text message and/or short message service (SMS) (e.g., respond with a numerical or other predefined code response via a text message); email; game platform messaging mechanisms; fax; social networking applications and/or websites; game, game platform and/or game service website; another game participant participating in the active game (e.g., acting on behalf of the disconnected user); or other such confirmations. It is noted, in some instances, the initial communication mode that was previously lost can also provide the confirmation of a user's intent to rejoin the game should the user reestablish a connection over the initial mode of communication.

When a confirmation has not been received, the process 510 enters step 520, in some implementations, where it is determined whether a confirmation threshold time period has been exceeded or expired. When the confirmation threshold has been reached the process terminates. Alternatively, the process returns to step 516 to determine whether the confirmation is received, and/or in some instances may return to step 512 to identify an alternative secondary mode of communication (e.g., if a first threshold has been reached but a second threshold has not been reached, the game server may initiate a confirmation request with an alternative secondary mode of communication). In those instances where confirmation is received the process in step 522 authorizes rejoining the first user. This authorization, in some embodiments, is conditioned on the user qualifying to rejoin, such as having paid a fee, having a user account level that allows the user to utilize the rejoining feature, other users have authorized the user to rejoin and/or other such factors or combinations of such factors. In step 524, a user's position within the simulation is maintained, and in some instances, prevents an application (e.g., matchmaker software) from identifying the user's vacated position as an open slot for new players, prevents other game players from switching teams and/or slots into the lost user's position, and/or otherwise taking action that would prevent the lost user from returning to her/his position within the game.

The process 510 then terminates, and the game server awaits the first user to reestablish the connection. For example, in some instances the process 210 is activated upon detection that the user is connecting with the game server. Some embodiments further employ a second threshold time period within which a user has to rejoin the game when the user is authorized to rejoin. This second threshold time period can be measured from the time the lost connection is detected, form the time the user is authorized to rejoin or from some other time. Further, this second threshold time period can be employed to limit and/or avoid prolonged inactivity associated with the user and/or adversely affecting other user's playback experiences.

Figure 6:
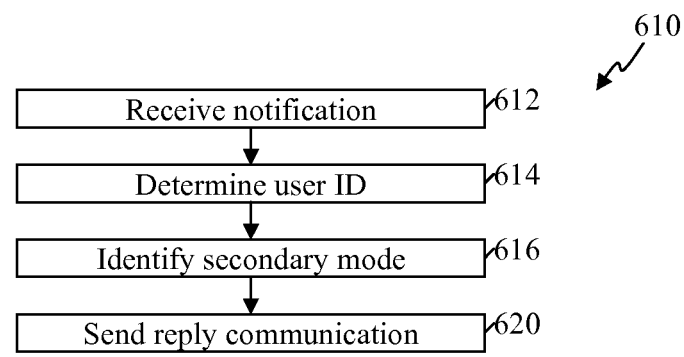
FIG. 6 depicts a simplified flow diagram of a process of a remote source, such as a third party service, providing information regarding the secondary mode of communication associated with a user that has lost connection with the game server.

FIG. 6 depicts a simplified flow diagram of a process 610 of a remote source, such as a third party service 314, providing information regarding the secondary mode of communication associated with a user that has lost connection with the game server. As described above, in some instances, the user may register or otherwise provide a third party or third party service with information regarding one or more secondary modes of communication. The third party service can be substantially any third party service that is associated with the game server or completely separate from and unassociated with the game server. For example, the game server can be a game server provided by Sony® (e.g., accessed via an Internet site (e.g., game1.sony.com)) while Sony® further provides a separate service (e.g., accessed via an Internet site (e.g., register.sony.com)) that allows users to register with the service, which can include providing the registration service with one or more secondary modes of communication and corresponding communication information (e.g., cellular communication and a corresponding cellular phone number). In other embodiments, the third party service 314 may be a social networking service (SN) that is not associated with the game server or a company providing the game or game server. For example, the company providing the game server can establish a profile on the social networking service that users can access and register at least the one or more secondary modes of communication. In yet other embodiments, a third party service 314 is unassociated with the game server 316 and the company providing the game or game server, and users can access and register with the separate third party service. The cooperation with a third party server and/or service can allow access from multiple gaming and/or other device platforms, social networks, competing companies, and the like, providing users with flexibility and compatibility.

Further, the additional, remote and/or third party storage and/or the third party service optionally acts, in some embodiments, as a central dispatch. This central dispatch could remove the need for users participating in simulations to know the digital address or communication mechanisms for each game server. Instead, the game server communicates with the central dispatch when a user connects, so that the central dispatch knows how to reach the user and/or the user's playback device or console. When a disconnect with a user is detected the game server can notify the central dispatch about the event, and allow the central dispatch to contact the user. As such, the user interacts with the central dispatch instead of endless numbers of different game servers across her/his game playing experiences.

Still referring to FIG. 6, in step 612 a notification is received at the third party service 314 that a connection is lost between the game server 316 and a game console or device. This notification does not have to be received from the game server 316. For example, the notification can be received from the user 312. In step 614, an identification of the user associated with the lost connection is determined. This can be supplied with the notification (e.g., the game server can provide a user identification), determined from the communication (e.g., based on a source of the communication when the notification is issued from the user, such as a user's phone number when the notification is issued from the user using a telephone or cellular phone), or otherwise identified.

Once the user has been identified, the process continues to step 616 to identify one or more secondary modes of communication associated with the identified user and the corresponding contact information for the secondary modes of communication (e.g., email address, phone number, and the like). In some instances, the secondary modes of communication are identified in a profile established for and/or by the user. In other embodiments, a database may be maintained by the third party service that associates user identifications with corresponding one or more modes of communication and the contact information.

In step 620, a communication is sent from the third party service 314 to the game server 316 with at least one of the secondary modes of communication and the corresponding contact information (e.g., phone number, email address, account name/number, and/or other such information). This communication can be over the distributed network, a separate network, a dedicated network, an alternate communication mode or other such methods.

Figure 7:
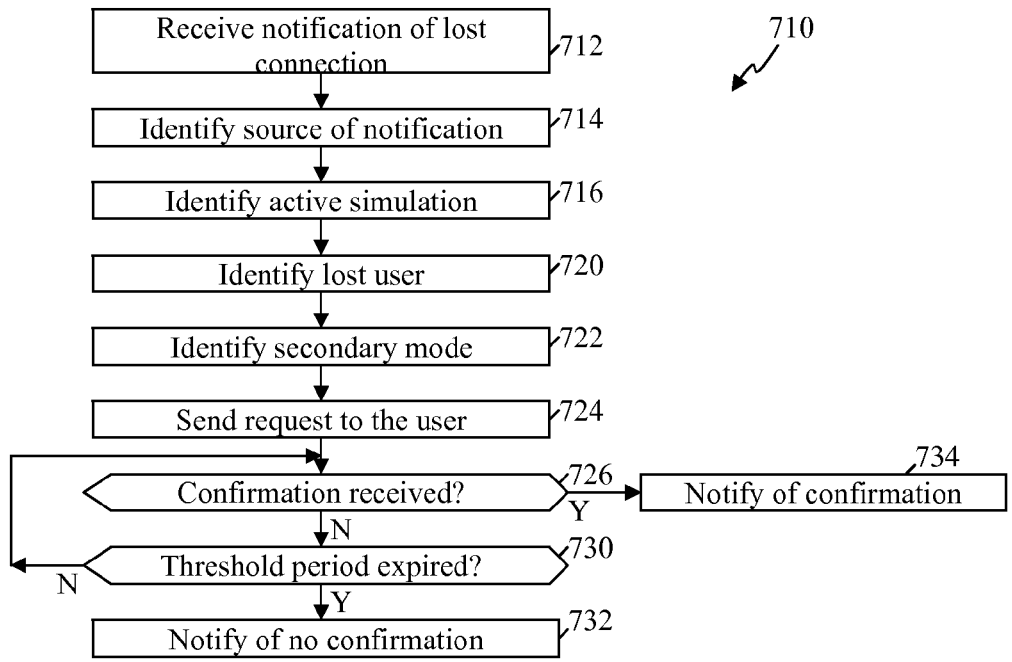
FIG. 7 depicts a simplified flow diagram of a process implemented by a third party device to contact a user using a secondary mode of communication to determine whether a user who has lost connection with the game server intends to return and rejoin the game.

FIG. 7 depicts a simplified flow diagram of a process 710 implemented by a third party device 314 to contact the user 312 using the secondary mode of communication to determine whether a user who has lost connection with the game server intends to return and rejoin the game. In step 712, the third party service or device 314 receives notification of the lost connection. Typically, the notification is issued from the game server 316 or other device associated with the game server. In step 714, the source sending the notification is identified. In step 716, the active game, simulation and/or application in which the user was participating is identified. In step 720, the user 312 with which the connection was lost is identified. In some embodiments, the game server, the game and the user are identified from the initial notification. In other instances, a series of communications may be exchanged to obtain this information. For example, in response to the notification the third party service 314 may issue an acknowledgment and in response to the acknowledgment further information may be supplied to the third party service 314. The use of the acknowledgment may improve the ability to obtain the confirmation from the user by allowing the game server 316 to issue a notification to multiple third party devices and receive an acknowledgment from a device having the capacity to request confirmation from the user (e.g., request in the shortest amount of time). Alternatively, should an acknowledgment not be received from an initial third party device the game server, in some implementations, may be able to issue a subsequent request to an alternative third party device or service.

Once the user is indentified, the process 710 continues to step 722 to identify one or more secondary modes of communication associated with the user. In step 724, a request is sent to the user 312 using one or more of the identified secondary modes of communication, and requesting confirmation that the user intends to rejoin the game. In step 726, it is determined whether the confirmation from the user is received. Typically, this confirmation is received over the secondary mode of communication. When a confirmation is not received the process advances to step 730 to determine whether a confirmation threshold period of time has been reached or has expired. In some embodiments, the confirmation threshold period at the third party service 314 may be different than a confirmation threshold period at the game server 316. In those instances where the confirmation threshold has not been reached the process returns to step 726 to determine whether the confirmation is received. Again, some embodiments may utilize an alternate or additional secondary mode of communication if an initial threshold time has expired that is less than the confirmation threshold (e.g., returning to steps 722 and 724).

Alternatively, when the confirmation threshold has been reached a notification is communicated in step 732 to the game server 316 notifying the game server that no confirmation was received. A mode of communication with the game server may be specified in the notification of the loss of connection or some other communication from the game server or a previously defined mode of communication. Further, the notification that a confirmation was not received can additionally identify the user and the game or include some other identifier, such as an identifier that identifies the notification to the third party service of the loss of connection sent from the game server, so that the game server can accurately identify the game and/or the user for which no confirmation is received. When a confirmation is received in step 726, the process continues to step 734 where a communication is sent to the game server notifying the game server of the confirmation that the user intends to rejoin the game. Again, the notification can identify the game and/or user for which the confirmation is received.

Some embodiments take into consideration other users participating in the game when a user loses connection with the game server. This can include considering how the lack of the user's participation may affect other users, how the user's continued lack of participation while waiting to rejoin the game may affect other users, whether other users want to wait for and/or allow the lost user to rejoin the game, and/or other such considerations. These considerations additionally may vary depending on a state of the game, the game state associated with the lost user, the game state associated with the lost user relative to the game state of one or more other users, and other such factors. For example, when the game being participated in by the lost user is a team game and the lost user, at the time of the lost connection, has a leadership roll or otherwise has a dominate roll, the continued absence of the user may have significant effects on other users; while in other instances or states of a game the absence of the user may have no or little adverse effects on other users.

Figure 8:
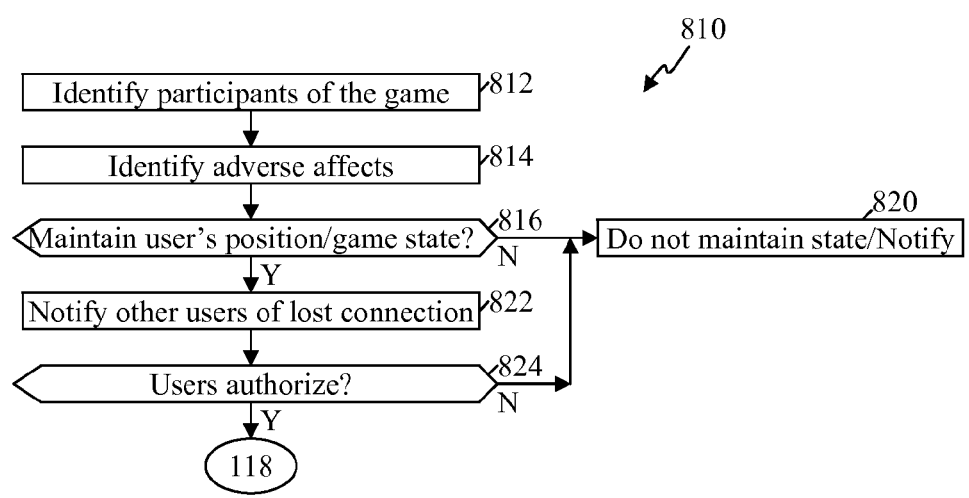
FIG. 8 depicts a simplified flow diagram of a process according to some embodiments that takes into consideration other users in determining whether to allow a user that has lost connection with the game server to rejoin the game.

FIG. 8 depicts a simplified flow diagram of a process 810 according to some embodiments that takes into consideration other users in determining whether to allow a user that has lost connection with the game server to rejoin the game. The process 810 can, in some instances, be implemented as part of step 216 of the process 210. In step 812, one or more other users participating in the active game are identified when other users are participating at the time the connection with the first user is lost. In step 814, adverse affects to the identified one or more other users are determined should the lost user's position be maintained. In step 816, it is determined, based at least in part on the adverse affects, whether to maintain the user's position and game state. For example, the game server or system can determine whether the lack of the lost user's participation will prevent the other one or more users from continuing to accurately participate in the game, whether there is a limited number of other users (e.g., one, a few users) and the loss of one user would significantly degrade the experience of the other users, and other such factors and/or considerations. Additionally, some embodiments consider whether the dropped user was the host, and whether host migration or transfer of server responsibilities would be delayed, which could be a critical issue in determining whether the lost user should be dropped. Accordingly, some embodiments consider issues where a delay in reconnecting the lost user would adversely affect game play for the other user, and may disallow a user from rejoining and/or implementing the game state preservation and reconnection.

In those instances where it is determined not to maintain the user's position step 820 is entered where the game state associated with the lost user is not maintained and the user is not provided the ability to rejoin the game. In some instances a notification may be issued to the user notifying the user that she/he cannot rejoin and/or providing reasoning why the user cannot rejoin.

When it is determined that the user's temporary absence from the game is allowed or the adverse effects are below a threshold tolerance the process 810 continues, in some embodiments, to step 822 where the one or more other users are notified of the lost connection with the first user. Further, some embodiments optionally include step 824, where it is determined whether the one or more other users authorize holding the user's game position. This determination can vary depending on the parameters of the game, the game set-up (e.g., as set up by an initial user), game states and/or other such factors. For example, the determination can be based on a majority decision by the one or more users, be based on a single vote to maintain the position, be based on a single vote not to maintain the position, or the like. In response to determining that the game state and user's position are not to be maintained the process continues to step 820.

The user's game position and/or game state are retained in response to receiving input from the one or more users that the position should be maintained for the user (e.g., step 118 of process 110 of FIG. 1). In some implementations, the communication with the lost user to request confirmation that the user intends to return to the game is postponed until determining whether the one or more other users authorize the lost user to return to the game.

Figure 9:
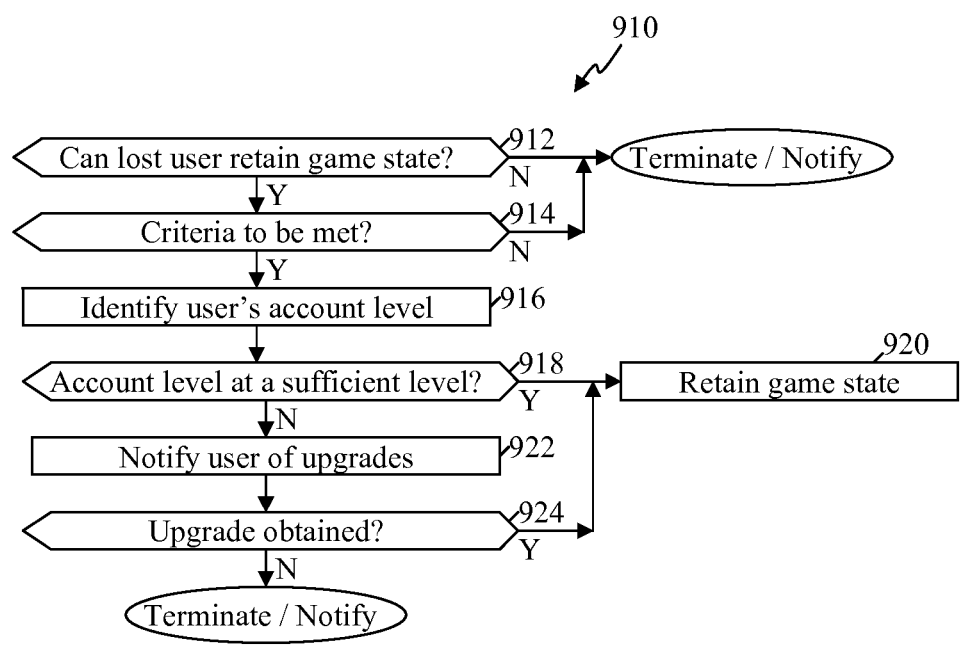
FIG. 9 depicts a simplified flow diagram of a process according to some embodiments that determines whether a user that has lost a connection with the game server is authorized to rejoin the active game.

FIG. 9 depicts a simplified flow diagram of a process 910 according to some embodiments that determines whether a user that has lost a connection with the game server is authorized to rejoin the active game. As described above, in some instances, the lost user may have to meet certain criteria or have certain levels of access before the user is authorized to take advantage of the ability to retain her/his game position and/or game state should the user's connection with the game server be lost. In some embodiments, the process 910 can implement some or all of step 216 of the process 210 of FIG. 2. In other embodiments, this process 910 may be implemented at the time the user joins the game, or prior to contacting the lost user to request confirmation that the lost user intends to rejoin the game. For example, the process 910 may be implemented following step 824 after identifying that other users authorize the lost user to rejoin the active game, while in other instances, some or all of the process 910 may be implemented prior to implementing the process 810 when process 810 is to be implemented.

In step 912, it is determined whether the user that lost the connection is barred from taking advantage of the ability to retain her/his position and/or game state. Some embodiments may have conditions that prevent a user from having the ability to rejoin a game. For example, it can be determined whether the same user has lost connection with the game server a predefined number of times, a predefined number of times during the active game, a predefined number of times during a given time period or the like (e.g., to improve game performance for the other users); other users have specified that the lost user should be prevented from rejoining; the game server and/or game application predicts and/or determines that the user is attempting to gain an advantage in the game by losing a connection; and/or other such factors or conditions. When the user is barred from rejoining the process 910 terminates, the game state associated with the user is not retained, and in some instances, the user may be notified that the user has lost connection and/or cannot rejoin.

The process 910 advances to step 914, when the user is not barred from taking advantage of the functionality to rejoin an active game, where it is determined whether there are criteria and/or conditions that the user has to meet before being qualified to take advantage of the functionality to rejoin a game. For example, some embodiments and/or game providers, game servers and/or games may require the user to reach certain levels, complete one or more tasks and/or obtain a certain amount of points, money or other indicators within the game; a user may have to be considered a frequent player (e.g., where the user has played a certain number of times and/or amount of time); whether the active game has been active for at least a predefined amount of time; whether the user has been participating within the active game for a predefined amount of time; whether other spots are available within the game; and/or other such criteria. When the criteria or conditions are not met the process 910 terminates, and in some instances a notification is issued to the user that the user cannot retain her/his position.

In step 916, an account level associated with the user is identified. In step 918 it is determined whether the account level allows the user's game state to be retained and the user to rejoin. As described above, in some embodiments, the user has to have a certain account level and/or have paid for the privilege to take advantage of the functionality to retain her/his game state and rejoin the active game after inadvertently losing connection with the game server. When it is determined in step 916 that the user has the appropriate account level, paid an appropriate fee and/or the like, the process advances to step 920 to initiate retaining the user's game state, and in some instances, retaining the user's position within the game (e.g., advancing to step 118 of the process 110).

When the user's account is not at the predefined level, the user has not paid the appropriate fee or the like the process terminates. Alternatively, some embodiments may allow the user to obtain an upgrade or pay a fee that would allow the user to have her/his game state retained and allow the user to rejoin the game. As such, some embodiments may advance to step 922 where the user is notified that upgrades may be available to allow the user to utilize the functionality of retaining her/his game state. Again, this notification is typically over the secondary mode of communication or other mode of communication. This notification, however, may be made over the direct or first connection between the game server and the user's game console when the user has again reestablished a connection with the game server. Further, this opportunity to upgrade may be limited, for example, such upgrading may not be available if it would result in delays that would adversely affect other users participating in the game.

In step 924 it is determined whether an upgrade, payment or the like has been received or otherwise authorized (e.g., authorize charging a user's account and/or credit card). When the upgrade is not received the process terminates. Alternatively, when the upgrade is detected the process 910 advances to step 920 to initiate retaining the user's game state.

Figure 10:
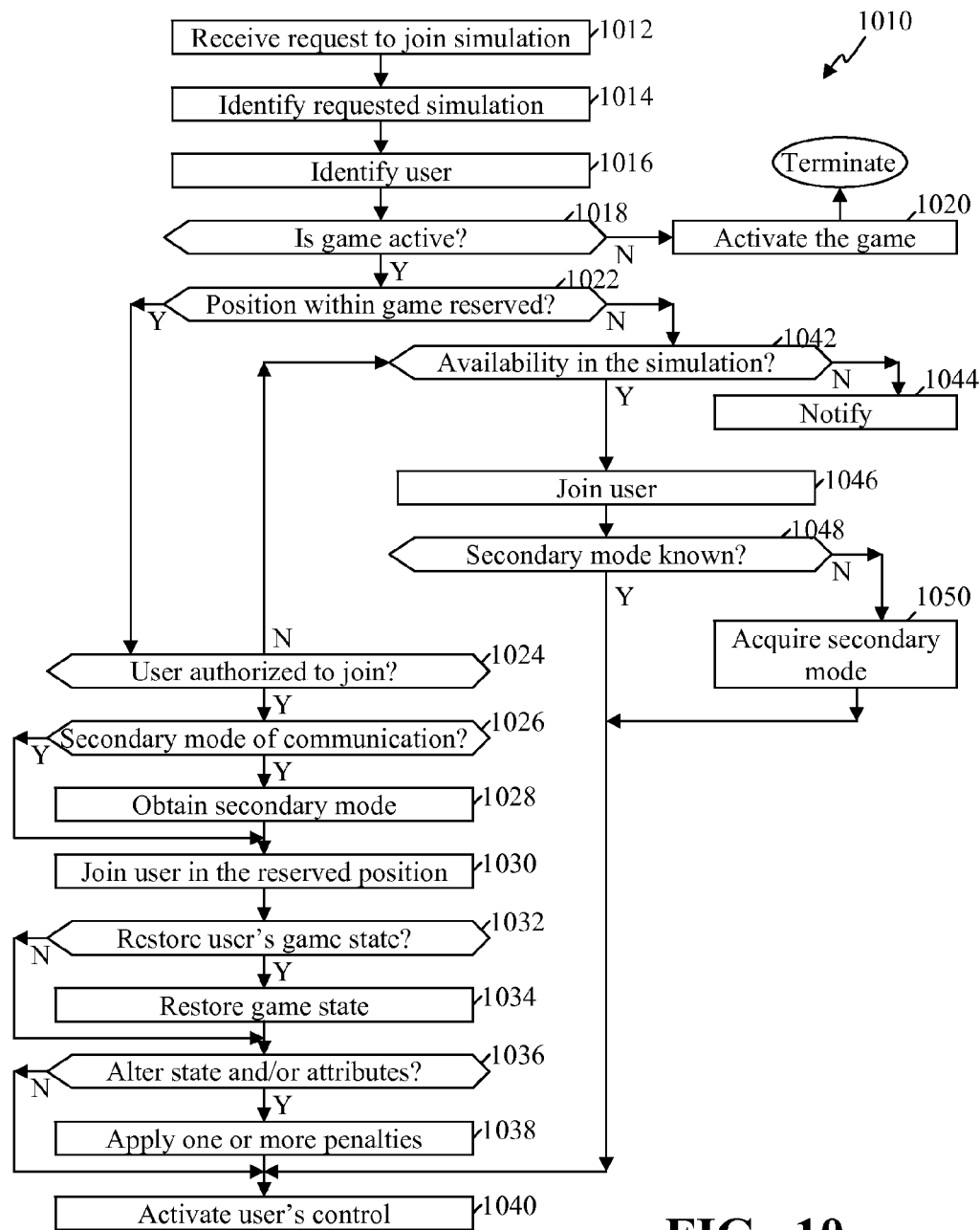
FIG. 10 depicts a simplified flow diagram of a process according to some embodiments of adding a user to a game or other simulation.

FIG. 10 depicts a simplified flow diagram of a process 1010 according to some embodiments of adding a user to a game or other simulation. This process can be implemented to identify those users that have provided notification to a game server 316 that the user intends to return after a connection or other failure occurred. In step 1012, a game server 316 receives a request from a user to join a game or other simulation. In step 1014, the game the user is requesting to join is identified. In step 1016, the user is identified. In step 1018, it is determined whether the identified game is active. In those instances where the game is active the process advances to step 1022. Alternatively, when the game is not active the process advances to step 1020 to activate the game. In some instances, the activation may be limited by one or more factors, such as the game being available through the game server, the user having the authority and/or account level to activate a game, and/or other such factors.

In step 1022, it is determined whether a position within the game is reserved for the identified user. This reserved position can, for example, be a result of a previous lost connection and the user confirming the user's intentions to rejoining the game. In those instances where there is not a reserved position the process advances to step 1042 to determine whether there is availability in the game to allow the user to join.

Alternatively, when there is a reserved position the process continues to step 1024 to determine whether the user is authorized to join in the reserved position. Again, some embodiments may have limitations or restrictions on allowing a user to take advantage of reserved positions, such as whether the active game allows users to join, whether a current state of the game allows a user to join in the reserved position, whether the user has the correct authorization and/or other such factors. In those instances when the reserved position cannot be utilized the process advances to step 1042.

When the user can be joined in the reserved position, some embodiments include step 1026 to confirm and/or determine whether a secondary mode of communication is known for the user. Again, some embodiments may instead rely on third party service to obtain the secondary mode of communication as described above. Step 1028 is entered to obtain and store the secondary mode of communication and contact information when the secondary mode of communication was not known or is updated.

In step 1030, the user is joined to the game in the reserved position. In step 1032, it is determined whether to restore a state relative to the user's playback, such as return a character within the game environment to a state of functionality, attributes and/or equipment (e.g., return a character that the user is controlling to a previous game state with the attributes, characteristics and/or functionality acquired by the user over the operation of the game). When a state is to be restored step 1034 is entered where the stored state is restored.

In step 1036, it is further determined whether a user's actions, statistics, attributes and/or game time are to be altered and/or penalties are to apply. Again, the penalties, lost game time, etc. may depend on the game or simulation, the affects on other users and the like, and can include loss of points, loss of characteristics and/or functionality, loss of money, loss of playing time, change in location within a game's virtual environment (e.g., a virtual world), change in a level within the game or a virtual world and/or other such penalties. When penalties are to apply the process 1010 advances to step 1038 where penalties are identified and applied. In step 1040 the user's controls within the game environment are activated (e.g., activate joined user's character and user's ability to control the character).

Again, when it is identified in step 1022 that there is not a reserved position for the user and/or it is determined in step 1024 that the user cannot be joined in the reserved position, the process 1010 advances to step 1042 to determine whether there is availability in the game to allow the user to be added. In those instances where there is a lack of availability step 1044 is entered where the user is notified, which may include further instructions (e.g., offers to join a different game, an expected wait time or other such information and/or instructions). Alternatively, the user is added to the game in step 1046. Some embodiments further include step 1048 to determine whether a secondary mode of communication is known. This step may be limited based on a determination of whether the user can take advantage of reserving their position within the game upon an inadvertent loss of connection or other such failure, whether the game allows a position to be reserved and/or other such limitations. In those instances where the secondary mode of communication is not known step 1050 is entered to acquire and store the secondary mode of communication and contact information. Again, in some other instances a game server may rely on another device, service and/or a third party service to acquire and/or maintain the user's secondary mode of communication. The process 1010 then advances to step 1040 to activate the user's control within the game.

As described above, the game server 316 or other device providing at least partial control of the simulation may take different actions in response to detecting the lost connection with a user. In some instances, the game server may halt the game playback until it confirms that the user is not returning (e.g., based on a threshold time, specific instructions from the lost user, or other such notification), continue playback while temporarily halting or removing the user's character within a game environment, taking control of the user's character and/or continuing to implement control in place of the user, and/or other such actions.

Figure 11:
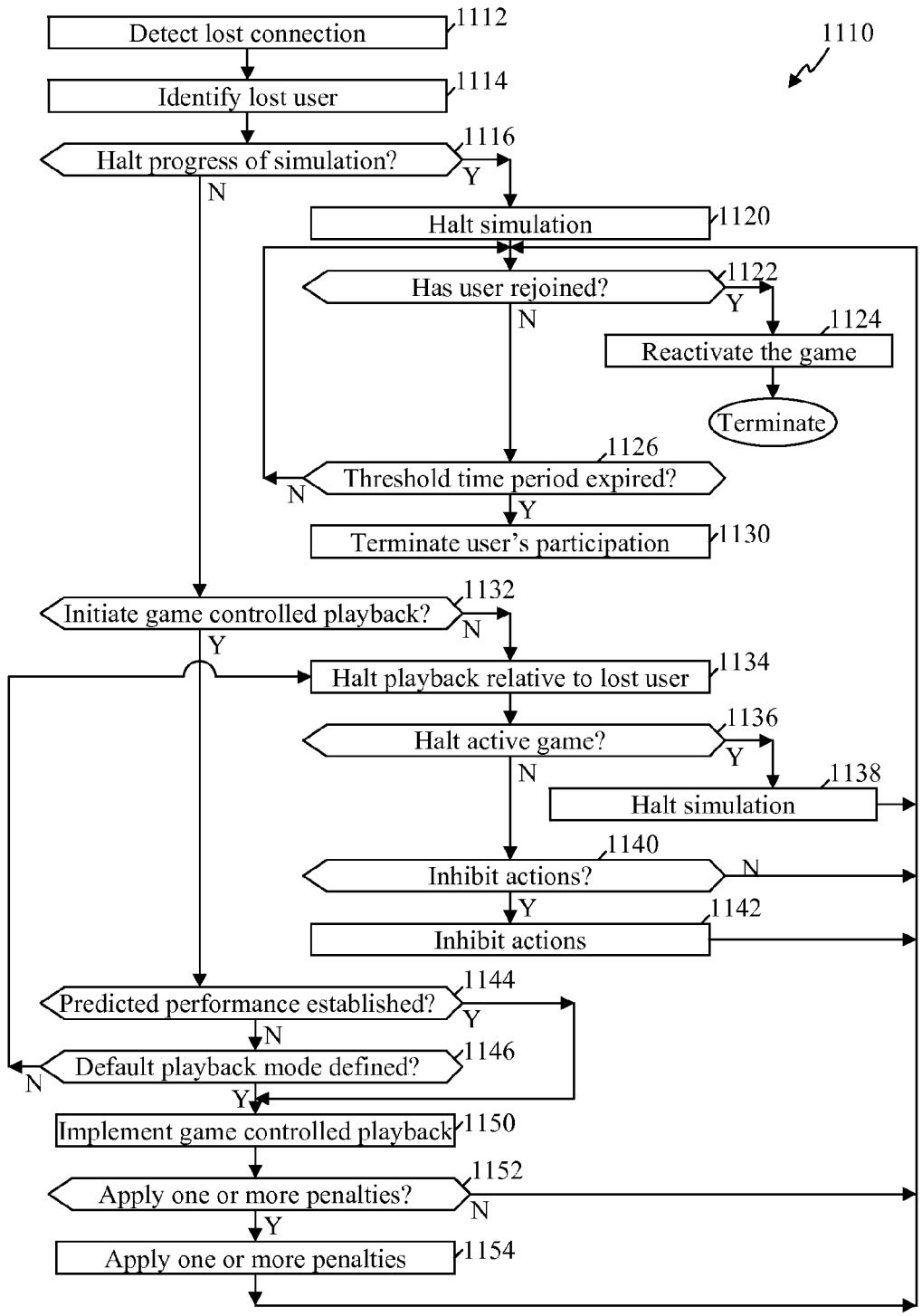
FIG. 11 shows a simplified flow diagram of an example process according to some embodiments in controlling a game or other simulation in response to detecting an unintended loss of connection with a user.

FIG. 11 shows a simplified flow diagram of an example process 1110 according to some embodiments in controlling a game or other simulation in response to detecting an unintended loss of connection with a user. In step 1112, the game server detects a loss of a user. In step 1114, the lost user is identified along with parameters associated with the user and the user's interaction with the game simulation, such as but not limited to the user's position within the game and parameters, attributes and the like associated with the user (e.g., identify the character within a game environment controlled by the user; identify the character's attributes, capabilities, powers, equipment, resources, and the like; identify a score associated with the user; identify a level of playback within the game environment; and/or other such parameters).

In step 1116, it is determined whether to halt progress of the game. In some instances, the playback of the game for all players may be halted in response to an unexpected loss of a user. The determination of whether to halt the game can depend on one or more factors, such as but not limited to a state of playback, how long a game has been active, whether there are any other users participating and/or how many other users are participating, the lost user's current position and/or status within the game, whether to implement control for the user, whether the temporary lack of user's participation will not adversely affect other users or will have a predicted limited adverse affect, whether other actions can be take to allow the game to continue and/or other such factors, whether one or more other users authorize the halt of the game, whether one or more other users instruct the lost user not be allowed to rejoin, whether one or more other users authorize the system to provide playback for the lost user, and/or other such factors. In those instances where the game is not to be halted the process advances to step 1132 to determine whether to initiate game server controlled playback.

Step 1120 is entered and the game is halted in response to determining in step 1116 that the game should be halted. In step 1122 it is determined whether the user has rejoined that game. When the user has rejoined step 1124 is entered where the game is reactivated. In those instances where the user has not rejoined step 1126 is entered to determine whether a rejoin threshold time period has expired. When the threshold period has not expired the process 1110 returns to step 1122 to determine whether the user has rejoined. Alternatively, when the threshold time period has expired step 1130 is entered where the user's position within the game is terminated and the game is reactivated for the remaining users. In some instances the lost user may be notified of the termination of her/his position and/or the other users participating in the game may be notified (e.g., through a notification on the game, through secondary modes of communication or other such notification).

Some embodiments include step 1132 where it is determined whether to initiate game server controlled playback relative to the lost user. In some embodiments, the game server can take control of playback for the lost user, such as taking control of a character that was being controlled by the lost user such that the game playback continues while trying to reduce or minimize the adverse affects to other users participating in the game. One or more factors can be taken into account in determining whether to allow the game server or another automated device to take control of playback relative to the lost user. Some of these factors can include but are not limited to whether a default playback capability is available for a given game simulation and/or the game server, whether there is sufficient data available to anticipate a user's actions during game server controlled playback, affects on other users that might result from the lost user's lack of participation, and other such factors and/or combinations of such factors.

When game server controlled playback is not to be implemented, the process 1110 continues to step 1134 where playback relative to the lost user is halted and/or frozen. In step 1136 it is determined whether the active game should be halted. Again, in instances where the lack of the lost user's participation is anticipated to result in adverse effects to other users that exceed a threshold the game server may halt the playback of the game until the lost user rejoins or a threshold time period is exceeded. This halting may additionally or alternatively be based on a response from one or more other users participating in the active game after having been notified that a user has been lost. Similarly, the halting of the game may be aborted in some instances where one or more other users participating in the active game block or deny the lost user's ability to rejoin the active game. In those instances where the active game is to be halted the process halts the game in step 1138 and returns to step 1122 to await the rejoining of the user or determination that the user is not rejoining It is noted that the threshold time period relative to step 1126 may be different when the game is halted than in other instances (e.g., because other users are waiting the threshold time may be reduced; because the game is halted adverse consequences within the game are avoided and thus the wait threshold can be extended; or other such scenarios).

When the game playback is not to be halted step 1140 is entered to determine whether to inhibit actions relative to the lost user's participation. For example, in a game simulation where the lost user was associated with and/or controlling a character within the game environment that character may be hidden. In other instances, the character controlled by the user may be faded out or presented as a "ghost" character indicating to other users participating in the simulation that the user is temporarily inactive. Additionally or alternatively, a bubble or text can be displayed relative to the user's game simulation representation (e.g., a character controlled by the lost user) notifying others participating in the game of the temporary inactivity, or otherwise inhibit the character's abilities within the game environment from advantageously and/or adversely affecting playback. In those instances where actions are to be inhibited relative to the lost user's participation the process 1110 advances to step 1142 where actions are inhibited, such as the character within the game environment associated with the lost user is hidden and/or presented as a ghost or shadow image.

When it is determined in step 1140 that actions are not to be inhibited and/or following step 1142 the process 1110 then returns to step 1122 to determine whether the user has rejoined. Again, the threshold time limit considered in step 1126 may be different than in other situations once actions relative to the user have been inhibited.

When it is determined in step 1132 that game server controlled playback is to be initiated the process 1110 advances to allow the game server to provide at least some control relative to the user's representation within the simulation, such as but not limited to allowing artificial intelligence to control the lost user's game play based on history, previously defined settings, some default behavior or some other implementation. For example, the game server may force the character controlled by the user to hide (e.g., run and hide behind a tree, structure or the like); replay the character's prior actions in one or more loops, which may depend on the situation and/or scenario within the game environment; make probabilistic choices based on the lost user's previous actions; control the character with aggressive, conservative, or other certain pre-defined settings (e.g., based on a user's current level within the game environment; a user's current score relative to other user's scores; and/or other such factors); perform game defaults, such as requiring continued ante's to stay at a simulated poker table with auto-folding at each hand until the user re-joins and/or the threshold time period expires; or perform other relevant actions.

As such, in some embodiments for example, the process 1110 continues to step 1144 to determine whether predicted user performance has been established. As described above, in some instances and/or with some simulations a user's actions may be tracked. Based on the tracked actions that game simulation and/or server can more accurately predict how a user would act and/or react to given situations, conditions and/or scenarios. In some situations, a threshold amount of data and/or duration of playback time have to be acquired and/or tracked before the game simulation and/or game server can provide anticipated actions that relatively closely approximate a user's actions. When it is determined in step 1144 that sufficient data has been obtained to continue playback of the game while the game server controls playback relative to the lost user, the process advances to step 1150 to continue playback while the game server applies predicted actions based on the user's past performance and/or actions. This game server interaction allows the game simulation to continue while providing the lost user with the ability to maintain her/his position and still allowing other users to continue to participate with limited or no adverse (or in some instances no beneficial) effects resulting from the lost user's temporary absence.

Alternatively, when it is determined in step 1144 that predicted user performance has not been established, the process continues to step 1146 to determine whether default playback mode is defined. In some implementations, the game server and/or simulation may provide a default playback that allows the game simulation and/or playback server to control interactions within the game relative to the lost user's participation (e.g., by controlling a character within the game environment) based on predefined and default actions corresponding to one or more conditions and/or parameters. When a default playback mode is not defined the process advances to step 1134 where playback relative to the lost user is halted.

When it is determined in steps 1144 and/or 1146 that playback can continue, the process 1110 continues to step 1150 where playback is continued while the game server and/or game simulation controls playback relative to the lost user. Some embodiments further include step 1152 to determine whether one or more penalties are to be assessed. As described above, in some instances one or more penalties may be applied in maintaining a user's position. In step 1154 one or more penalties are applied when it is determined in step 1152 that penalties are to be applied. The process then returns to step 1122 to determine whether the user has rejoined the active game.

As such, the game server and/or game simulation can be configured to provide a user with the ability to retain her/his position within a game in the event of lost connection or other adverse condition that prevents or limits a user's ability to effectively participate in a simulation. In some instances, the game server and/or simulation determines whether the user can take advantage of this functionality and/or notifies the user of the functionality. For example, in response to receiving a user's request to join a game the game server can notify the user of the functionality and/or that the user can upgrade to take advantage of the functionality to retain her/his position should an error occur limiting or preventing the user from continuing to participate in the simulation.

Figure 12:
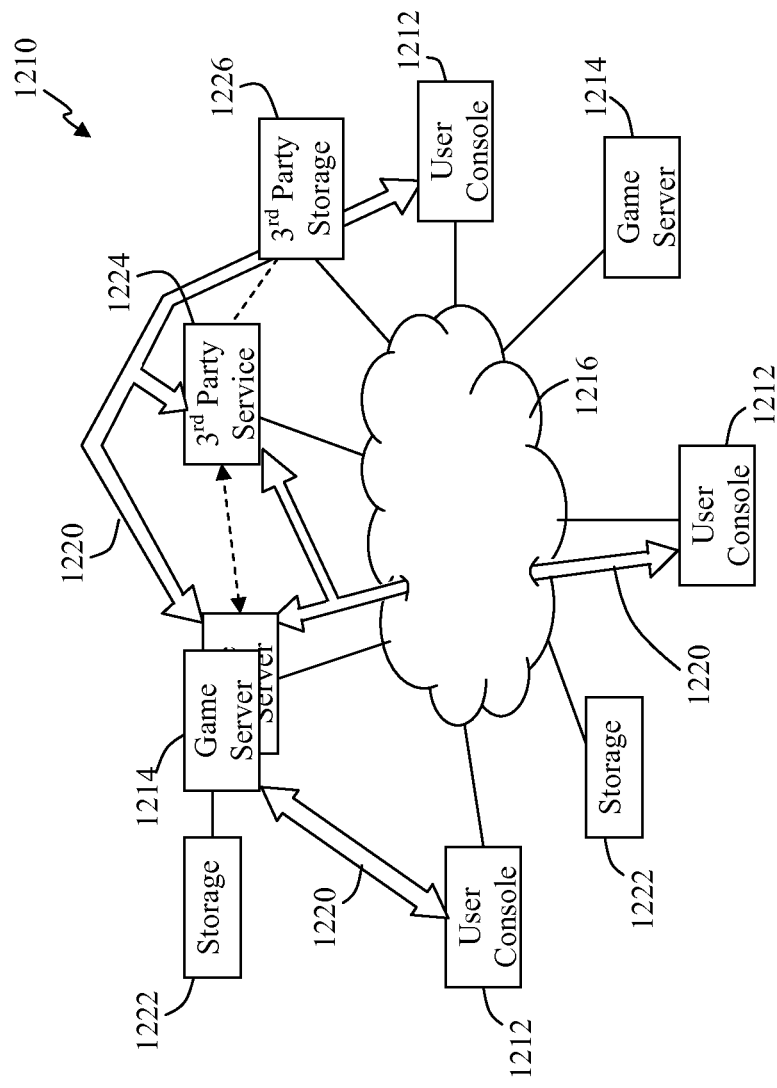
FIG. 12 depicts a simplified block diagram of a system according to some embodiments that allows users to participate in an interactive simulation and further provides the functionality to allow a user to retain a user's position within a game or other simulation.

FIG. 12 depicts a simplified block diagram of a system 1210 according to some embodiments that allows users to participate in an interactive simulation and further provides the functionality to allow a user to retain a user's position within a game or other simulation. The system 1210 includes one or more user consoles, gaming devices and/or other devices 1212 configured to coupled with and interact with one or more simulation or game servers 1214 over one or more distributed networks 1216, and one or more secondary modes of communication 1220. In some embodiments, one or more of the secondary modes of communication may utilize the distributed network 1216 as part or all of the communication paths and/or links to achieve the communication. Some embodiments further include data storage 1222, one or more third party services 1224 and/or third party data storage devices 1226.

Using the console or gaming devices 1212, users can connect with a game server 1214 over the distributed network 1216 to access and participate in a game or other simulation. Further, the secondary modes of communication 1220 allow the game server 1214 and/or a third party service 1224 to communicate with the users over one or more of the secondary modes of communication 1220. In some instances the users have a secondary communication device (not shown), such as a cellular phone, a computer, or other such device, that can be used to communicate with the game server 1214 and/or third party service 1224 via the secondary mode of communication 1220.

As described above, in some embodiments, the game server 1214 communicates with a third party service 1224 to obtain secondary mode of communication information for a user and/or to request that the third party service implement communication with a user via the secondary mode of communication. This connection with the third party service may be over the distributed network 1216, a direct connection or some other mode and/or path of communication. Again, the third party service 1224 can be substantially any third party service, such as but not limited to a dedicated service for maintaining user information, a third party web site (e.g., a social networking web site), or substantially any other such service and/or entity.

The console 1212 can include substantially any relevant device to participate in an interactive game or simulation hosted by the game server 1214. For example, the user device can be a game console (e.g., a Sony PlayStation®), a portable gaming device (e.g., a Sony PlayStation Portable (PSP)), a cellular phone, a computer, or other relevant user device that allows a user to connect with the game server 1214 and participate in an interactive simulation.

Figure 13:
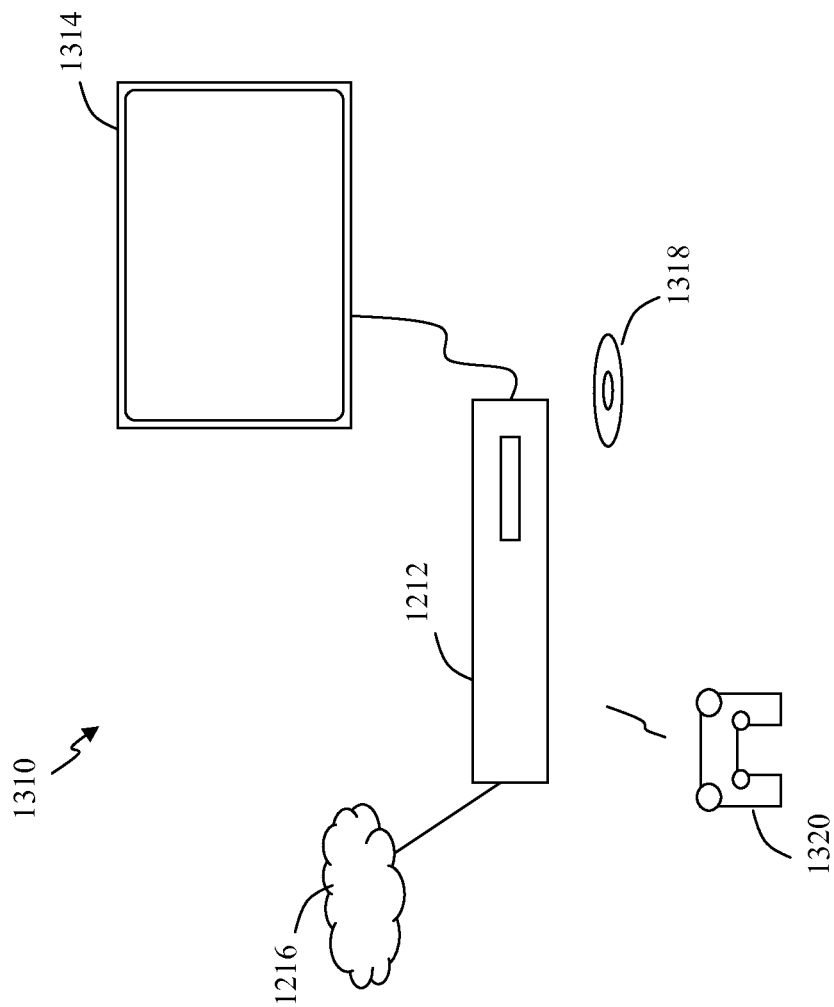
FIG. 13 depicts a simplified block diagram illustrating a user device or system that operates in accordance with some embodiment to allow a user to access and participate in an interactive simulation, such as an online interactive game.

FIG. 13 depicts a simplified block diagram illustrating a user device or system 1310 that operates in accordance with some embodiment to allow a user to access and participate in an interactive simulation, such as an online interactive game. As illustrated in FIG. 13, the user device or system 1310 can include a computer, game console, entertainment system/console or the like 1212, which may include or be coupled to a display device 1314, such as a television, monitor, or other type of visual display. The console 1212 further couples with the distributed network 1216 to allow the user to access and participate with an interactive simulation. In some embodiments, a game, software, executables, or other simulations may be stored on a storage media 1318 such as a Blu-ray disc, DVD, a CD, flash memory, USB memory or other type of memory media that can be used as a stand alone or in cooperation with a simulation accessed at a game server 1214. The storage media 1318 can be coupled with and/or be inserted into the console 1212 where it is read. The console can access the remote game server 1214 and/or program instructions locally stored and/or stored on the storage media 1318 to present an interface to the user, such as a game or simulation interface.

Typically, a user or player utilizes a user interface or input device that is integral with the console 1212 and/or external to the console, such as buttons, touch pad, track ball, a game controller 1320, a keyboard, mouse, or other such user input device or controller that is integral with or wired and/or wirelessly coupled with the console 1212. For example, a user interfaces with and manipulates an input device such as a game controller 1320 to control and interact with the video game or other simulation. The game controller 1320 may include conventional controls, for example, control input devices such as joysticks, buttons and the like. In addition, the game controller 1320 can include an internal sensor, for example an accelerometer, which produces signals in response to the position motion orientation or change in orientation of the game controller 1320. In some instances, the game controller 1320 can include light emitting diodes (LEDs) or other indicators and/or other photonically detectable ("PD") elements. The phrase game controller is used to describe any type of Human Input Device (HID) or other input device used to interact with a game. The phrase game console is used to describe any type of computer, computing device, portable device, or game system that can execute a game program and/or communicate with the game server 1214 and allow a user to interact with and participate in a simulation.

During operation of the console 1212 when user is playing a game, the user can use the game controller 1320 to interact with the game. For example, the user may push buttons, or uses a joystick on the game controller 1320 to interact with the game. In some embodiments, the user can additionally or alternatively move the game controller 1320 in a direction such as up, down, to one side, to the other side, twisted, wedged, shaken, jerked, punched, etc. In addition to using the game controller 1320 to interact with the game, use of buttons, joysticks, and movements of the controller 1320, and the like, may be detected and captured in the console or gaming device 1212, for example using imaging and/or acoustic data, for analysis of the user's interaction, controls and/or game performance.

In general, signals from the game controller 1320 and/or detected movements of the game controller are used to generate positions and orientation data that may be used to calculate many physical aspects of the user's interaction with a game. Certain movement patterns or gestures for the controller 1320 may be predefined and used as input commands for the game or other simulation. For example, a plunging downward gesture of the controller 1320 may be defined as one command, a twisting gesture of the controller 1320 may be defined as another command, a shaking gesture of the controller 1320 may be defined as still another command, and so on. In this way the manner in which the user physically moves the controller 1320 can be used as an input for controlling the game which provides more pleasurable and stimulating experience for the user.

Again, FIG. 13 is one example of a user device and/or system 1310 that allows a user to participate in an interactive simulation. Other similarly devices can alternatively or additionally be used. For example, the user device may be a portable device with similar functionality as the user system 1310, with a built in display and user interface, and in some instances may utilize portable memory. As another example, the console 1212 may comprise a computer.

Figure 14:
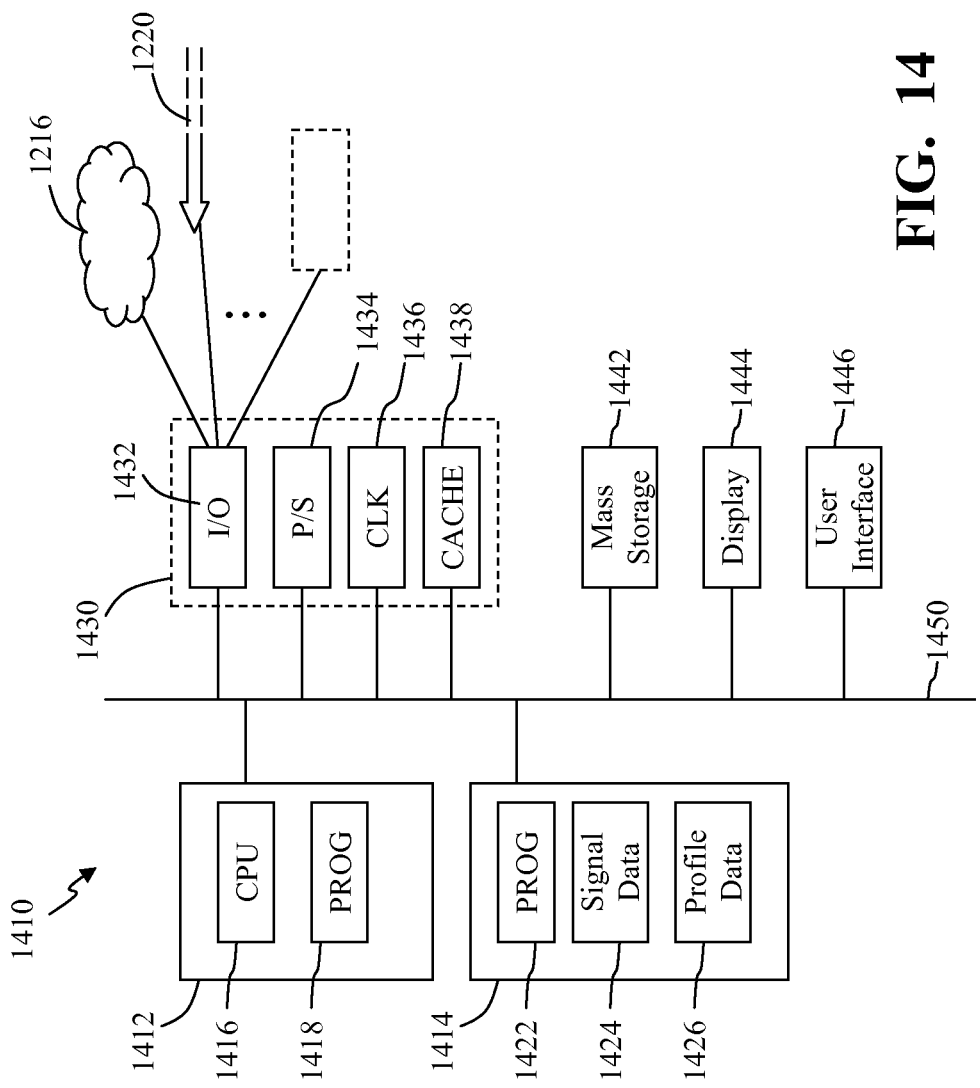
FIG. 14 is a block diagram of a system or apparatus that may be used to implement various embodiments described herein.

FIG. 14 is a block diagram of a system or apparatus 1410 that may be used to implement various embodiments described herein. For example, the system 1410 may be used to implement one or more game servers that host and/or provide users the ability to participate in a simulation using signals, data, information, instructions, commands, software, executables, and/or instructions from the user device, locally stored and/or accessed from remote storage.

The system 1410 comprises an example of a processor based system or apparatus, and may include one or more processor modules 1412 and memory modules 1414. In some embodiments, memory module 1414 may be RAM, DRAM, ROM, and/or substantially any other relevant digital storage memory and/or combinations of such storage. In addition, the system 1410 may have multiple processor modules 1412, for example when parallel processing is to be implemented. The processor module 1412 can include a central processing unit (CPU) 1416. In addition, the processor module 1412 can include local storage or a cache 1418 to store executable programs, information and/or data.

The memory module 1414 can include software, executables, programs and the like 1422, such as game program storage. In addition, the memory module 1414 can include signal data storage 1424, for example, signal data acquired from one or more user devices. The memory module 1414 can also include user and/or playback device data 1426 such as user profile data as well as game statistics that may be provided.

The system 1410 further includes support function module 1430 such as input/output elements 1432, power supplies 1434, a clock 1436, in cache memory 1438, and/or other such support functions. The input/output elements 1432 allow the game server to couple with and communicate over the distributed networks 1216, the secondary modes of communication 1220, and/or couple with other devices. The system 1410 may also optionally include mass storage module 1442 such as a disc drive, flash memory, Blu-ray disc drive, CD ROM drive, DVD drive, USB drive, tape drive or the like to store programs and/or data. The mass storage module 1442, which may include removable storage media, may be used for storing code that implements some or all of the methods and techniques described herein. It should be understood that any of such storage devices mentioned herein may serve as a tangible processor and/or computer readable storage medium for storing or embodying a processor and/or computer program for causing a console, apparatus, system, computer, or other processor based system to execute or perform the steps of any of the methods, code, and/or techniques described herein. Furthermore, any of the storage devices, such as the RAM or mass storage module, may be used for storing any needed database(s).

The system 1410 may also optionally include one or more display modules and/or drives 1444 as well as one or more user interface modules 1446 to facilitate interaction between the system 1410 and one or more system controllers. Display module 1444 output signals to a display device and/or may be in the form of a cathode ray tube, a flat panel screen, touch screen display, or any other display module. The user interface module 1418 may include and/or be communication ports to a keyboard, mouse, joystick, write pen, game controller and/or other device such as a microphone, optical sensor, video camera or other user input device. The processor, memory, and other components within the system 1410 may exchange signals such as code instructions and data with each other via one or more system communication networks and/or buses 1450.

Figure 15:
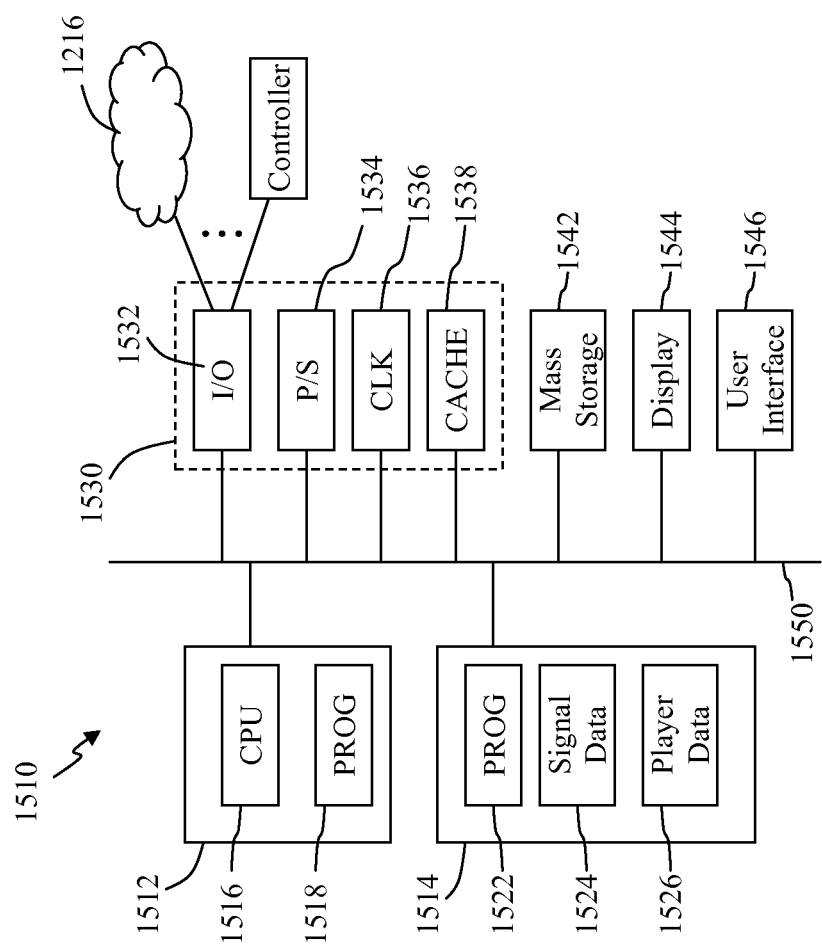
FIG. 15 is a block diagram of a user device, system or apparatus that may be used to implement various embodiments described herein.

FIG. 15 is a block diagram of a user device, system or apparatus 1510 that may be used to implement various embodiments described herein. For example, the system 1510 may be used to generate and render a simulation using signals, data, information, instructions, commands, software, executables, and/or instructions from the game server, locally stored and/or accessed from the medium 1318. By way of example, the system/apparatus 1510 may comprise a game console, gaming system/apparatus, entertainment apparatus/system, computer, a portable gaming apparatus, a portable cellular phone, a portable smart phone, and/or other such relevant devices that allow a user to connect with a game server and participate in an interactive simulation.

The system 1510 comprises an example of a processor based system or apparatus. As shown in FIG. 15, the system 1510 may include a processor module 1512 and a memory module 1514. In some embodiments, memory module 1514 may be RAM, DRAM, ROM, and/or substantially any other relevant digital storage memory and/or combinations of such storage. In addition, the system 1510 may have multiple processor modules 1512, for example when parallel processing is to be implemented. The processor module 1512 can include a central processing unit (CPU) 1516. In addition, the processor module 1512 can include local storage or a cache 1518 to store executable programs, information and/or data.

The memory module 1514 can include software, executables, programs and the like 1522, such as game program storage. In addition, the memory module 1514 can include signal data storage 1524, for example, signal data acquired from game controller operated by a user. The memory module 1514 can also include player data 1526 such as player profile data as well as game statistics that may be provided.

The system 1510 may also include well-known support function module 1530 such as input/output elements 1532, power supplies 1534, a clock 1536, in cache memory 1538, and/or other such support functions. The system 1510 may also optionally include mass storage module 1542 such as a disc drive, Blu-ray disc drive, CD ROM drive, DVD drive, USB drive, tape drive or the like to store programs and/or data. The mass storage module 1542, which may include removable storage media, may be used for storing code that implements some or all of the methods and techniques described herein. It should be understood that any of such storage devices mentioned herein may serve as a tangible processor and/or computer readable storage medium for storing or embodying a processor and/or computer program for causing a console, apparatus, system, computer, or other processor based system to execute or perform the steps of any of the methods, code, and/or techniques described herein. Furthermore, any of the storage devices, such as the RAM or mass storage module, may be used for storing any needed database(s).

The system 1510 may also optionally include a display module and/or drive 1544 as well as a user interface module 1546 to facilitate interaction between the system 1510 and the user. Display module 1544 output signals to a display device and/or may be in the form of a cathode ray tube, a flat panel screen, touch screen display, or any other display module. The user interface module 1518 may include and/or be communication ports to a keyboard, buttons, mouse, joystick, write pen, game controller and/or other device such as a microphone, video camera or other user input device. The processor, memory, and other components within the system 1510 may exchange signals such as code instructions and data with each other via one or more system communication networks and/or buses 1550.

Various embodiments described may be implemented primarily in hardware, or software, or a combination of hardware and software. For example, a hardware implementation may include using, for example, components such as application specific integrated circuits ("ASICs"), or field programmable gate arrays ("FPGAs"). Implementation of a hardware state machine capable of performing the functions described herein will also be apparent to those skilled in the relevant art.

The term "module" and/or "device" as used herein means, but is not limited to a software or hardware component, such as an FPGA or an ASIC, which performs certain tasks. A module or device may advantageously be configured to reside on an addressable storage medium and configured to execute on one or more network enabled devices or processors. Thus, a module or device may include, by way of example, components, processes, functions, attributes, procedures, subroutines, segments of program code, drivers, firmware, microcode, circuitry, data, databases, data structures, tables, arrays, variables, and the like. The functionality provided for in the components, modules and/or devices may be combined into fewer components, modules and/or devices, or further separated into additional components, modules and/or devices. Additionally, the components, modules and/or devices may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a Blu-ray disc, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

By way of example, in some embodiments a storage medium may store a computer program executable by a processor based system/apparatus. The computer program may be configured to cause the processor based system to execute steps comprising any of the processes, methods and/or techniques described herein. For example, in some embodiments, one or more of the embodiments, methods, approaches, processes and/or techniques described above may be implemented in a computer program executable by a processor based system/apparatus. By way of example, such processor based system/apparatus may comprise the processor based system/apparatus 1410, a similar apparatus, or a computer, entertainment system, game console, etc. Such computer program may be used for executing various steps and/or features of the above-described processes, methods and/or techniques. That is, one or more computer programs may be adapted to cause or configure a processor based system to execute and achieve the functions described above. For example, such computer program may be used for implementing any embodiment of the above-described processes, methods and techniques, such as for example, retaining a user's position within an active simulation in the event a user losses connection or otherwise is unable to continue participating in the simulation. As another example, such computer program may be used for implementing any type of tool or similar utility that uses any one or more of the above described embodiments, processes, methods, approaches, and/or techniques. In some embodiments, the computer program may comprise a video game, computer game, role-playing game (RPG), or other computer simulation. In some embodiments, program code modules, loops, subroutines, etc., within the computer program may be used for executing various steps and/or features of the above-described processes, methods and/or techniques. In some embodiments, the computer program may be stored or embodied on a processor and/or computer readable storage or recording medium or media, such as any of the computer readable storage or recording medium or media described herein.

Therefore, some embodiments provide a computer program product comprising a medium for embodying a computer program for input to a processor and/or computer and a computer program embodied in the medium for causing the processor and/or computer to perform or execute steps comprising any one or more of the steps involved in any one or more of the embodiments, processes, methods, approaches, and/or techniques described herein. For example, some embodiments provide a computer readable storage medium storing a computer program adapted to cause a processor based system to execute steps comprising: detecting a loss of connection with a first user remotely accessing and actively participating in an interactive electronic game in progress; determining, in response to detecting the loss of the connection with the first user, a gaming state associated with the first user; determining whether a confirmation is received from the first user confirming that the first user intends to rejoin the interactive game; and retaining, in response to determining that the confirmation is received, the game state.

As another example, some embodiments provide a computer readable storage medium storing a computer program adapted to cause a processor based system to execute steps comprising: providing a gaming environment configured to allow one or more users to remotely access and participate in an interactive game; identifying a first user actively participating in the interactive game; detecting a loss of connection with the first user while the interactive game is still in progress; determining, in response to detecting the loss of the connection with the first user, a gaming state associated with the first user; receiving a confirmation from the first user that the first user intends to rejoin the same interactive game; retaining, in response to receiving the confirmation from the first user, the game state to be re-associated with the first user in response to the first user rejoining the interactive game; reestablishing, in response to initiating a reactivation of the first user as a game character within the interactive game, a state of playback corresponding to the first user within the interactive game as defined by the retained game state.

Some embodiments further assess one or more penalties to the first character within the game environment. Additionally, some embodiments in retaining the game state: maintain one or more scores corresponding to the first character at a time during the active game when the loss of the connection is detected; and adjust one or more of the one or more scores by applying the one or more penalties to corresponding ones of the one or more scores establishing one or more adjusted score; wherein the reestablishing the state of playback corresponding to the first user can comprise reactivating the first user to control playback relative to the first character and associating the one or more adjusted scores with the first character. Further, some embodiments detect a loss of connection with a second user remotely accessing and actively participating in the interactive game in progress; retain a game state associated with the second user configured to be re-associated with the second user should the second user rejoin the interactive game; receive input from one or more users other than the second user participating in the interactive game; determine, from the input from the one or more users other than the second user, whether the one or more users other than the second user authorize the second user to rejoin the interactive game; and prevent the second user from rejoining the interactive game in response to determining that the one or more other users did not authorize the second user to rejoin the game.

As another example, some embodiments provide a computer readable storage medium storing a computer program adapted to cause a processor based system to execute steps comprising: detecting a loss of a connection on a first mode of communication and over a distributed network with a first user participating in an interactive game; identifying a secondary mode of communication associated with the first user; requesting, using the secondary mode of communication and in response to detecting the loss of the connection, confirmation from the first user that the first user intends to rejoin the interactive game; determining, in response to issuing the request for the confirmation that the first user intends to rejoin the interactive game, whether the first user intends to rejoin the interactive game; and retaining, in response to determining that the first user intends to rejoin the interactive game, a game state associated with the first user of the interactive game at a time the loss of the connection was detected. In some implementations, the identifying the secondary mode of communication associated with the first user comprises: requesting, over the network and from a third party service, the secondary mode of communication, and corresponding contact information associated with the first user for the secondary mode of communication; and receiving, from the third party service and over the network, an identification of the secondary mode of communication and the corresponding contact information.

As mentioned above, in some embodiments the game controller or other input device may comprise a motion sensing controller or other motion sensing input device. In some embodiments, such motion sensing controller may comprise a hand-held controller that has the ability to have its three-dimensional movements tracked. Such tracking may be performed in many different ways. For example, such tracking may be performed through inertial, image, video, acoustical, infrared and/or other such analysis. Such motion sensing capabilities may also be implemented with an accelerometer or the like. As another example, such motion sensing capabilities may be implemented in some embodiments with a so-called "six-axis controller" or the like.

In some embodiments, the server (e.g., game server) may attempt to identify an actual time when a user lost connection instead of merely saving state information at the time when the game server detects that a user lost connection, which may be several seconds or even minutes after the connect was actually lost. Whether a game server or other server can identify a time of disconnect, earlier to the time of recognition of disconnect, can in part depend on the implementation of the simulation or game. This includes the transient nature of quickly changing data and simulation states, detailed history of prior events, and the like. Accordingly, in some instances a server may go back and review a defined period of the prior playback to see whether the loss of connection may have actually occurred prior to detecting the lost connection by, for example, attempting to determine whether there were failures to take action and/or actions were abnormal or unusual. When it is determined that the loss of connection occurred earlier in the playback the server can adjust parameters, attributes, scores and other such parameters associated with the user when saving a user's state. It is noted, however, that the server may not perform such an evaluation and/or may not perform the evaluation in instances where it is unlikely to identify when a loss occurred, the changes in state are too rapid and/or when such adjustments may be unfair, cause an injustice or inconsistency for remaining players.

In instances where multiple users are simultaneously lost, or lost in relatively close timing, the server can continue to perform the above procedures in preserving game states for each lost user as though the loss were just one player disconnected. It is possible, in some embodiments, that a game may extend an option for plug-in code, such as custom code that the game service executes for making decisions based on the game state in how to response to multiple user's being lost (e.g., halting the entire game, rewinding the game to a point where loss was detected, etc.).

Further, in those instances when a game server goes down the game is typically considered terminated in most cases. In others instances, however, it may be a function of the host machine, the cluster of remaining game servers, or of the game state preservation service to restart the game server and attempt to reconnect all the dropped players. This would include the use of plug-in code, such as code specific to a game, running on a possibly central, generic game state preservation service.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of providing an interactive electronic game, the method comprising:
   detecting, at a game hosting device, a loss of connection over a distributed network with a first gaming device operated by a first user without notification from the first gaming device of the loss of connection, the first user remotely accessing and participating, through the first gaming device, in an interactive electronic game in progress and hosted by the game hosting device, wherein detecting the loss of connection comprises detecting a loss of connection between the first gaming device and the game hosting device over a first communication mode;
   determining, by the game hosting device and in response to detecting the loss of the connection with the first user, a game state associated with the first user;
   determining, by the game hosting device and after detecting the loss of connection and in response to detecting the loss of connection, whether a confirmation is received from the first user through a smart phone confirming that the first user intends to rejoin the interactive game, wherein the smart phone is not the first gaming device through which the first user was accessing and participating in the interactive electronic game prior to the loss of connection, wherein the confirmation received from the first user through the smart phone is received using a second communication mode different than the first communication mode, the second communication mode providing a communication channel between the smart phone and the game hosting device; and
   in response to determining that the confirmation is received, the game hosting device storing the game state on one or more associated memory devices.

2. The method of claim 1, further comprising:
   rejoining the first user to the interactive game;
   reestablishing the first user's control over a first game character within the interactive game, wherein the first user was controlling the first game character prior to detecting the loss of the connection; and
   reestablishing, through the game hosting device, a state of playback corresponding to the first game character within the interactive game as defined by the retained game state.

3. The method of claim 2, wherein the storing the game state comprises reserving a position on a team of one or more interactive game characters within the interactive game, wherein the one or more interactive game characters are controlled by one or more second users continuing to playback the interactive electronic game while the connection with the first user is lost; and wherein the reestablishing the state of playback corresponding to the first user comprises reactivating the first game character within the interactive game in the position on the team.

4. The method of claim 2, wherein the retaining the game state comprises:
   identifying that the first user is associated with the first game character within the interactive game; and reserving the first game character of a plurality of game characters within the interactive game, such that another user cannot join the interactive game in place of the first game character.

5. The method of claim 2, wherein the storing the game state comprises maintaining attributes of the first game character within the interactive game controlled by the first user at a time during the interactive game when the loss of the connection is detected; and
wherein the reestablishing the state of playback corresponding to the first user comprises re-associating the first user with the first game character and configuring the first game character with the maintained attributes.

6. The method of claim 2, wherein the reestablishing the state of playback comprises:
receiving input from one or more other users participating in the interactive game;
determining, from input from the one or more other users, whether the one or more other users authorize the first user to rejoin the interactive game; and
authorizing the reestablishing of the first user to the interactive game after it is determined that the one or more other users authorize the first user to be reinstated.

7. The method of claim 1, wherein the first communication mode over the distributed network allows the first user, through the first gaming device, to interact with the interactive game hosted remotely from the first gaming device by the game hosting device, and wherein the second communication mode is not used by the first gaming device.

8. The method of claim 7, further comprising:
communicating a request to the first user requesting said confirmation that the first user intends to rejoin the interactive game, wherein the communicating the request comprises communicating the request in response to the game hosting device detecting the loss of connection and communicating the request over the second communication mode to the smart phone that is not the first gaming device; and
wherein the confirmation is received in response to the request for the confirmation that the first user intends to rejoin the interactive game.

9. The method of claim 7, wherein the receiving the confirmation comprises receiving, at the game hosting device, the confirmation from a predefined, remote third party source with which the first user communicates, wherein the third party source is independent of the first user, independent of the game hosting device and not operated by the first user.

10. The method of claim 1, further comprising:
rejoining the first user with control over a first game character within the interactive game; and
reestablishing a state of playback corresponding to the first game character within the interactive game as defined by the stored game state.

11. The method of claim 10, wherein the storing the game state comprises reserving a position on a team of one or more interactive game characters within the interactive game, and wherein the reestablishing the state of playback corresponding to the first user comprises reactivating the first user within the interactive game in the position on the team.

12. The method of claim 1, further comprising:
identifying the second communication mode associated with the first user, wherein the second communication mode is through the smart phone that is distinct and separate from the first gaming device and does not communicate through the first gaming device; and
requesting, using the second communication mode provided by the smart phone and in response to detecting the loss of the connection, confirmation from the first user that the first user intends to rejoin the interactive game.

13. The method of claim 1, further comprising:
identifying, in response to detecting the loss of connection, the second communication mode associated with the first user; and
requesting, using the second communication mode and in response to detecting the loss of the connection, confirmation from the first user that the first user intends to rejoin the interactive game;
wherein the identifying the second communication mode associated with the first user comprises:
requesting, from a third party service, the second communication mode, and corresponding contact information associated with the first user for the second communication mode; and
receiving, from the third party service and over the network, an identification of the second communication mode and the corresponding contact information.

14. A computer program product comprising a non-transitory computer readable storage medium for embodying a computer program for input to a processor based system and a computer program embodied in the medium for causing the processor based system to perform steps of:
detecting a loss of connection over a distributed network with a first gaming device operated by a first user without notification from the first gaming device of the loss of connection, the first user remotely accessing and participating, through the first gaming device, in an interactive electronic game in progress, wherein detecting the loss of connection comprising detecting a loss of connection between the first gaming device and a game hosting device over a first communication mode;
determining, in response to detecting the loss of the connection with the first user, a game state associated with the first user;
determining, after detecting the loss of connection and in response to detecting the loss of connection, whether a confirmation is received from the first user through a smart phone confirming that the first user intends to rejoin the interactive game, wherein the smart phone is not the first gaming device through which the first user was accessing and participating in an interactive electronic game prior to the loss of connection, wherein the confirmation received from the first user through the smart phone is received using a second communication mode different than the first communication mode, the second communication mode providing a communication channel between the smart phone and the game hosting device; and
in response to determining that the confirmation is received, the game hosting device storing the game state on one or more associated memory devices.

15. The computer program product in accordance with claim 14, wherein the computer program is further configured for causing the processor based system to perform the steps of:
identifying, at the game hosting device and in response to the game hosting device detecting the loss of connection, the second communication mode associated with the first user, wherein the second communication mode is not used by the first gaming device; and
requesting, using the second communication mode and in response to detecting the loss of the connection, confirmation from the first user that the first user intends to rejoin the interactive game.

16. The computer program product in accordance with claim 14, wherein the computer program is further configured for causing the processor based system to perform the step of:
- rejoining the first user to the interactive electronic game that is continued to be played back by one or more other users while the connection with the first gaming device was lost, and reestablishing the first user's control over a first game character within the interactive game, where the first user was controlling the first game character prior to detecting the loss of connection; and
- reestablishing a state of playback corresponding to the first game character within the interactive game as defined by the stored game state.

17. A system configured to allow users to participate in an interactive game, the system comprising:
- a processor; and
- memory accessible by the processor, the memory storing programming that when implemented by the processor causes the processor to perform the steps of:
  - detecting a loss of connection over a distributed network with a first gaming device operated by a first user remotely accessing and participating, through the first gaming device, in an interactive electronic game in progress, wherein the detecting the loss of connection comprises detecting the loss of connection without notification from the first gaming device of the loss of connection, wherein detecting the loss of connection comprising detecting a loss of connection between the first gaming device and a game hosting device over a first communication mode;
  - determining, in response to detecting the loss of the connection with the first user, a game state associated with the first user;
  - determining, after detecting the loss of connection and in response to detecting the loss of connection, whether a confirmation is received from the first user through a smart phone confirming that the first user intends to rejoin the interactive game, wherein the smart phone is not the first gaming device through which the first user was accessing and participating in an interactive electronic game prior to the loss of connection, wherein the confirmation received from the first user through the smart phone is received using a second communication mode different than the first communication mode, the second communication mode providing a communication channel between the smart phone and the game hosting device; and
  - in response to determining that the confirmation is received, the game hosting device storing the game state on one or more associated memory devices.

18. The system of claim 17, wherein the processor, when implementing the programming, is further configured to implement the steps of:
- identifying, at the game hosting device and in response to the game hosting device detecting the loss of the connection, the second communication mode associated with the first user, wherein second communication mode is not used by the first gaming device; and
- requesting, using the second communication mode and in response to detecting the loss of the connection, confirmation from the first user that the first user intends to rejoin the interactive game.

19. The system of claim 18, wherein the processor, when implementing the programming, is further configured to implement the steps of:
- rejoining the first user to the interactive game and reestablishing the first user's control over a first game character within the interactive game, where the first user was controlling the first game character prior to detecting the loss of connection; and
- reestablishing a state of playback corresponding to the first game character within the interactive game as defined by the stored game state.

* * * * *